United States Patent
Nada et al.

(10) Patent No.: US 9,379,391 B2
(45) Date of Patent: Jun. 28, 2016

(54) AIR ELECTRODE MATERIAL POWDER FOR SOLID OXIDE FUEL CELL AND ITS PRODUCTION PROCESS

(71) Applicant: AGC SEIMI CHEMICAL CO., LTD, Chigasaki-shi (JP)

(72) Inventors: Futoshi Nada, Chigasaki (JP); Michinori Suehara, Tokyo (JP); Takanori Ito, Chigasaki (JP); Takene Hirai, Chigasaki (JP)

(73) Assignee: AGC SEIMI CHEMICAL CO., LTD., Chigasaki-shi (JP)

( * ) Notice: Subject to any disclaimer, the term of this patent is extended or adjusted under 35 U.S.C. 154(b) by 3 days.

(21) Appl. No.: 14/451,197

(22) Filed: Aug. 4, 2014

(65) Prior Publication Data
US 2015/0162621 A1 Jun. 11, 2015

Related U.S. Application Data (63) Continuation of application No. PCT/JP2013/054229, filed on Feb. 20, 2013.

(30) Foreign Application Priority Data

Mar. 9, 2012 (JP) ................................ 2012-053479

(51) Int. Cl.
| | |
|---|---|
| *B01J 23/10* | (2006.01) |
| *H01M 4/90* | (2006.01) |
| *C01G 51/00* | (2006.01) |
| *C04B 35/26* | (2006.01) |
| *C04B 35/626* | (2006.01) |
| *H01M 4/88* | (2006.01) |
| *H01M 4/86* | (2006.01) |
| *H01M 8/12* | (2016.01) |

(52) U.S. Cl.
CPC ............. *H01M 4/9033* (2013.01); *C01G 51/68* (2013.01); *C04B 35/2633* (2013.01); *C04B 35/62655* (2013.01); *C04B 35/62685* (2013.01); *H01M 4/88* (2013.01); *C01P 2002/34* (2013.01); *C01P 2002/74* (2013.01); *C01P 2004/61* (2013.01); *C04B 2235/3213* (2013.01); *C04B 2235/3227* (2013.01); *C04B 2235/3272* (2013.01); *C04B 2235/3275* (2013.01); *C04B 2235/442* (2013.01); *C04B 2235/449* (2013.01); *C04B 2235/5436* (2013.01); *C04B 2235/6562* (2013.01); *C04B 2235/768* (2013.01); *H01M 2004/8689* (2013.01); *H01M 2008/1293* (2013.01); *H01M 2300/0074* (2013.01); *Y02E 60/50* (2013.01); *Y02E 60/525* (2013.01)

(58) Field of Classification Search
CPC ........................................................ B01J 23/10
USPC ............................................................ 502/303
See application file for complete search history.

(56) References Cited

U.S. PATENT DOCUMENTS

2012/0021330 A1    1/2012   Kobayashi et al.

FOREIGN PATENT DOCUMENTS

| | | |
|---|---|---|
| EP | 2 410 598 | 1/2012 |
| JP | 2002-93422 | 3/2002 |
| JP | 2004-55193 | 2/2004 |
| JP | 2006-32132 | 2/2006 |
| JP | 2009-35447 | 2/2009 |
| JP | 2012-43774 | 3/2012 |
| JP | 2012-138256 | 7/2012 |
| JP | 2012-227070 | 11/2012 |

OTHER PUBLICATIONS

International Search Report issued May 28, 2013 in PCT/JP2013//054229 filed Feb. 2, 2013.

*Primary Examiner* — Edward Johnson
(74) *Attorney, Agent, or Firm* — Oblon, McClelland, Maier & Neustadt, L.L.P.

(57) ABSTRACT

To provide an air electrode material powder for a solid oxide fuel cell, comprising a novel LSCF powder having a highly uniform composition suitable as an air electrode material for a solid oxide fuel cell, and its production process.

A composite oxide having a perovskite structure and containing lanthanum, strontium, cobalt, iron and oxide, wherein the dispersion point determined by the peak intensity [La] of the $L\alpha 1$ characteristic X-ray of lanthanum and the peak intensity [Sr] of the $L\alpha 1$ characteristic X-ray of strontium as obtained by EPMA measurement, is present within a range of the formula (1) and the dispersion point determined by the peak intensity [Co] of the $K\alpha 1$ characteristic X-ray of cobalt and the peak intensity [Fe] of the $K\alpha 1$ characteristic X-ray of iron is present within a range of the formula (2):

$$a[\text{La}]-150 \leq [\text{Sr}] \leq a[\text{La}]+150 \quad (1)$$

$$b[\text{Co}]-300 \leq [\text{Fe}] \leq b[\text{Co}]+300 \quad (2)$$

wherein $0.2 \leq a \leq 1.0$ and $0.1 \leq b \leq 4.0$.

11 Claims, 4 Drawing Sheets

AIR ELECTRODE MATERIAL POWDER FOR SOLID OXIDE FUEL CELL AND ITS PRODUCTION PROCESS

TECHNICAL FIELD

The present invention relates to an air electrode material powder for a solid oxide fuel cell, comprising a powder of a composite oxide containing lanthanum, strontium, cobalt, iron and oxygen and having a perovskite structure, particularly comprising a powder having a high uniformity of constituting elements in particles of the powder, and its production process.

BACKGROUND ART

A solid oxide fuel cell is a fuel cell employing as an electrolyte a solid electrolyte having oxygen ion conductivity, and attracts attention as a clean energy since the electrochemical reaction which causes electromotive force is a hydrogen oxidation reaction, and no carbon dioxide gas is formed. A solid oxide fuel cell usually has a stack structure comprising single cells each comprising an air electrode as an oxide, a solid electrolyte and a fuel electrode connected by an interconnector. Its operating temperature is usually about 1,000° C., and decrease in the temperature is attempted and practically employed by various studies, however, it is at least about 600° C. and is still high temperature.

Due to the cell structure and the high operating temperature of a solid oxide fuel cell, an air electrode material constituting the air electrode is basically required to have such properties that (1) it has a high oxygen ion conductivity, (2) it has a high electron conductivity, (3) its thermal expansion is similar to or about the same as that of an electrolyte, (4) it has high chemical stability and has high compatibility with other constituting materials, and (5) the sintered product is required to be a porous product and it has a certain strength, etc.

As a material of an air electrode which satisfies such properties, a composite oxide represented by $(La_{1-x}Sr_x)_aCo_yFe_{1-y}O_3$ (hereinafter sometimes referred to as LSCF) having a perovskite structure is energetically studied and developed as an air electrode material excellent in the electrode activity.

For example, Patent Document 1 discloses a ceramic powder containing as the main component a lanthanum ferrite perovskite oxide. Specifically, it discloses a ceramic powder represented by a compositional formula $(L_{1-x}AE_x)_{1-y}(Fe_zM_{1-z})O_{3+\delta}$, wherein L is one or more of elements selected from the group consisting of rare earth elements such as La, Sc and Y, AE is one or two of elements selected from the group consisting of Sr and Ca, M is one or more of elements selected from the group consisting of Co, Mg, Sc, Ti, V, Cr and Ni, $0<x<0.5$, $0<y\le0.04$ and $0\le z<1$ (claims).

And, specifically disclosed as a method for preparing the ceramic powder is to mix and pulverize lanthanum oxide, strontium carbonate, cobalt oxide and iron oxide in a solid phase using e.g. a mortar (hereinafter sometimes referred to as a solid phase method) and calcine the mixture (paragraphs [0032] and [0092] to [0094] (Example 1)).

However, by such a solid phase method, so long as four types of raw material element-containing particles are pulverized and mixed in a solid phase, it is difficult in principle to obtain one having a completely uniform composition at the micro level.

Further, Patent Document 1 discloses in Examples 2 to 3 and 6 to 11 an example in which $(La_{0.6}Sr_{0.4})_{1-z}(Co_{0.2}Fe_{0.8})O_{3+\delta}$ (y=0, 0.02, 0.04) having a specific surface area of 4 m²/g prepared by a citrate method, in addition to a solid phase method, is wet mixed with ethanol and then pressure-molded. This method is the method disclosed in the after-mentioned Comparative Example 1, and by this method, raw material powders are mixed in a solution of citric acid alone, $La_2O_3$ as one of the raw material powders and a citrate after the reaction are not sufficiently dissolved, and the system is in a slurry state (hereinafter this method will sometimes be referred to as a slurry method).

Further, Patent Document 2 discloses an air electrode material powder for a solid electrolyte fuel cell, which is a perovskite composite oxide powder represented by the formula $ABO_3$, wherein the A site comprises at least one element selected from the group consisting of La and rare earth elements, and at least one element selected from the group consisting of Sr, Ca and Ba, and the B site comprises at least one element selected from the group consisting of Mn, Co, Fe, Ni and Cu, which is fine with an average particles size of at most 1 μm, and which has a narrow particle size distribution (claims).

Patent Document 2 relates to a LSCF powder having a small particle size and having a small dispersion of the particle size distribution, and to prepare such a powder, water-soluble nitrates of La, Sr, Co and Fe as raw material elements are dissolved in a predetermined proportion in water, $NH_4OH$ is added thereto to coprecipitate the respective insoluble salts, and the precipitates are dried and fired (hereinafter sometimes referred to as a coprecipitation method) (paragraph [0032]).

Since in this coprecipitation method precipitates are formed from a uniform solution, it is apparently considered that one having a uniform composition is easily formed, however, according to studies by the present inventors, in practice, the precipitates do not have a uniform composition since the pH at which insoluble salts of the respective elements precipitate and their crystal growth rates are different among the nitrates of the four types of elements. For example, a salt of one element is precipitated first and grows into large particles, and then micro crystals of the next element are precipitated on the large particles, and accordingly it is considered difficult in principle to obtain precipitates having a sufficiently uniform composition.

PRIOR ART DOCUMENTS

Patent Documents

Patent Document 1: JP-A-2009-35447
Patent Document 2: JP-A-2006-32132

DISCLOSURE OF INVENTION

Technical Problem

As mentioned above, in conventional LSCF fine particles prepared by a solid phase method, a coprecipitation method or the like or further by a slurry method, the above four elements La, Sr, Co and Fe are hardly completely uniform in principle.

Under these circumstances, it is an object of the present invention is to provide a novel LSCF powder which is suitable as an air electrode material for a solid oxide fuel cell and which has a highly uniform composition, and a production process to obtain such a LSCF powder having a uniform composition.

Solution to Problem

The present inventors have conducted extensive studies to achieve the above object and as a result, found that a novel particulate powder having a uniform composition even at the micro level, which has not been present, can be obtained by reacting raw material powders containing four elements of La, Sr, Co and Fe with an organic acid in a liquid to form a complex compound and substantially completely dissolving it, and spray drying the solution in a micro fine droplet state. The present invention has been accomplished on the basis of such a discovery.

That is, the present invention provides the following.

[1] An air electrode material powder for a solid oxide fuel cell, comprising a powder of a composite oxide having a perovskite structure and containing lanthanum, strontium, cobalt, iron and oxygen, wherein the dispersion point determined by the peak intensity [La] of the Lα1 characteristic X-ray of lanthanum and the peak intensity [Sr] of the Lα1 characteristic X-ray of strontium, obtained by EPMA (electron probe microanalyzer) measurement of element distribution of the powder, is present within a range of the formula (1), and the dispersion point determined by the peak intensity [Co] of the Kα1 characteristic X-ray of cobalt and the peak intensity [Fe] of the Kα1 characteristic X-ray of iron is present within a range of the formula (2):

$$a[La]-150 \leq [Sr] \leq a[La]+150 \quad (1)$$

$$b[Co]-300 \leq [Fe] \leq b[Co]+300 \quad (2)$$

wherein $0.2 \leq a \leq 1.0$ and $0.1 \leq b \leq 4.0$.

[2] The air electrode material powder for a solid oxide fuel cell according to the above [1], wherein the composition of the composite oxide is represented by the formula (I):

$$(La_{1-x}Sr_x)_aCo_yFe_{1-y}O_3 \quad (I)$$

wherein $0.1 \leq x \leq 0.5$, $0.1 \leq y \leq 0.9$, and $0.95 \leq a \leq 1.0$.

[3] An air electrode for a solid oxide fuel cell, obtained by sintering the air electrode material powder for a solid oxide fuel cell as defined in the above [1] or [2].

[4] A process for producing the air electrode material powder for a solid oxide fuel cell as defined in the above [1] or [2], which comprises forming compounds each containing a metal element constituting the composite oxide into a solution using an aqueous solution of an organic acid, spray drying the obtained solution and firing the obtained dry powder.

[5] The process for producing the air electrode material powder for a solid oxide fuel cell according to the above [4], wherein the number of moles of the organic acid used is from 2.3 to 10 times the total number of moles of the metal elements of the compounds each containing a metal element.

[6] The process for producing the air electrode material powder for a solid oxide fuel cell according to the above [4] or [5], wherein the organic acid is at least one member selected from the group consisting of maleic acid, lactic acid and malic acid.

[7] The process for producing the air electrode material powder for a solid oxide fuel cell according to the above [4] or [5], wherein the organic acid is a mixture of citric acid with at least one member selected from the group consisting of maleic acid, lactic acid and malic acid.

[8] The process for producing the air electrode material powder for a solid oxide fuel cell according to the above [4] or [5], wherein the organic acid is a mixture of citric acid with malic acid.

[9] The process for producing the air electrode material powder for a solid oxide fuel cell according to any one of the above [4] to [8], wherein the organic acid is citric acid, and when the compounds each containing a metal element constituting the composite oxide are formed into a solution using the aqueous solution of the organic acid, an ammonium compound is further added.

[10] The process for producing the air electrode material powder for a solid oxide fuel cell according to the above [9], wherein the ammonium compound is at least one member selected from the group consisting of ammonia, ammonium bicarbonate, ammonium carbonate and an ammonium citrate.

[11] The process for producing the air electrode material powder for a solid oxide fuel cell according to any one of the above [4] to [10], wherein each of the compounds each containing a metal element constituting the composite oxide is at least one member selected from the group consisting of a carbonate, an oxide, a hydroxide and an organic acid salt of each metal element.

[12] The process for producing the air electrode material powder for a solid oxide fuel cell according to any one of the above [4] to [11], wherein the firing temperature is from 700° C. to 1,300° C.

Advantageous Effects of Invention

According to the present invention, provided are an air electrode material powder for a solid oxide fuel cell, comprising a composite oxide having a perovskite structure and containing lanthanum, strontium, cobalt, iron and oxygen and having a more highly uniform composition as compared with one obtained by a conventional solid phase method, coprecipitation method or slurry method, and its production process.

DESCRIPTION OF EMBODIMENT

The air electrode material powder for a solid oxide fuel cell, which is a composite oxide having a perovskite structure and containing lanthanum, strontium, cobalt, iron and oxygen, of the present invention, preferably has a composition represented by the formula (I):

$$(La_{1-x}Sr_x)_aCo_yFe_{1-y}O_3 \qquad (I)$$

wherein $0.1 \leq x \leq 0.5$, $0.1 \leq y \leq 0.9$, and $0.95 \leq a \leq 1.0$.

The composition of oxygen is stoichiometrically 3, but in some cases, the composition may be partially deficient in oxygen or oxygen may be present in excess, and so long as the composite oxide of the present invention contains perovskite structure $(La_{1-x}Sr_x)_aCo_yFe_{1-y}O_3$ as the main component, other impurity phases may be present.

In the above formula (I), when $0.1 \leq x \leq 0.5$, $0.1 \leq y \leq 0.9$, and $0.95 \leq a \leq 1.0$ are satisfied, the composite oxide keeps the perovskite structure, such being favorable.

Examples of a composite oxide LSCF represented by the formula (I) include the following, but needless to say, it is not limited to such examples.

$La_{0.6}Sr_{0.4}Co_{0.2}Fe_{0.8}O_3$
(LSCF: 6428, x=0.4, y=0.2, a=1.0)
LSCF: 6428 means that the molar ratio of La, Sr, Co and Fe in the composite oxide LSCF is 6:4:2:8, and the same applies hereinafter.
$La_{0.8}Sr_{0.2}Co_{0.2}Fe_{0.8}O_3$
(LSCF: 8228, x=0.2, y=0.2, a=1.0)
$La_{0.6}Sr_{0.4}Co_{0.4}Fe_{0.6}O_3$
(LSCF: 6446, x=0.4, y=0.4, a=1.0)
$La_{0.64}Sr_{0.36}Co_{0.8}Fe_{0.82}O_3$
(LSCF: 6428, x=0.36, y=0.18, a=1.0)
$La_{0.588}Sr_{0.392}Co_{0.2}Fe_{0.8}O_3$
(LSCF: 6428, x=0.4, y=0.2, a=0.98)

In the present invention, a LSCF powder (also referred to as fine particles) of such a composite oxide is preferably obtained by the method (referred to as a complete dissolution method) disclosed in the present invention, and the LSCF powder is characterized in that the uniformity of composition of the respective components (La, Sr, Co and Fe) in the fine particles is very high as compared with known particles.

In the present invention, the uniformity (dispersion) of components of the composite oxide fine particles is evaluated by the peak intensities of the characteristics X-ray of lanthanum, strontium, cobalt and iron obtained by EPMA measurement, and specified as follows.

That is, by EPMA, of the composite oxide fine particles, peak intensities of the characteristic X-ray of lanthanum, strontium, cobalt and iron which are elements constituting the composite oxide are measured. On that occasion, of the powder of the composite oxide of the present invention, the dispersion point determined by the peak intensity [La] of the Lα1 characteristic X-ray of lanthanum and the peak intensity [Sr] of the Lα1 characteristic X-ray of strontium is present within a range of the formula (1), and the dispersion point determined by the peak intensity [Co] of the Kα1 characteristic X-ray of cobalt and the peak intensity [Fe] of the Kα1 characteristic X-ray of iron is present within a range of the formula (2):

$$a[La]-150 \leq [Sr] \leq a[La]+150 \qquad (1)$$

$$b[Co]-300 \leq [Fe] \leq b[Co]+300 \qquad (2)$$

In the formula (1), the coefficient a of the peak intensity [La] of the Lα1 characteristic X-ray of lanthanum is a value determined by the ratio of the concentration of strontium to the concentration of lanthanum in the composite oxide fine particles, and is larger as the lanthanum concentration is lower and the strontium concentration is higher.

Further, in the formula (2), the coefficient b of the peak intensity [Co] of the Kα1 characteristic X-ray of cobalt is a value determined by the ratio of the concentration of iron to the concentration of cobalt in the composite oxide fine particles, and is larger as the cobalt concentration is lower and the iron concentration is higher.

In the present invention, it is more preferred that the dispersion point determined by the peak intensity [La] of the Lα1 characteristic X-ray of lanthanum and the peak intensity [Sr] of the Lα1 characteristic X-ray of strontium is present within a range of the formula (1-2) and the dispersion point determined by the peak intensity [Co] of the Kα1 characteristic X-ray of cobalt and the peak intensity [Fe] of the Kα1 characteristic X-ray of iron is present within a range of the formula (2-2).

$$a[La]-125 \leq [Sr] \leq a[La]+125 \qquad (1-2)$$

$$b[Co]-250 \leq [Fe] \leq b[Co]+250 \qquad (2-2)$$

wherein a and b are as defined in the formulae (1) and (2).

This is because lanthanum, strontium, cobalt and iron as elements constituting the composite oxide are more uniformly distributed in the particles.

The results of the EPMA measurement will be described in further detail with reference to $La_{0.6}Sr_{0.4}Co_{0.2}Fe_{0.8}O_3$ (LSCF: 6428, x=0.4, y=0.2, a=1.0).

The above LSCF (6428) may be represented as $ABO_3$, that is, $(La_{0.6}Sr_{0.4})(Co_{0.2}Fe_{0.8})O_3$.

Originally, the ratio lanthanum/strontium of lanthanum to strontium constituting the A site should be constant at 0.6/0.4 i.e. 1.5 when the composition is completely uniform. Accordingly, in the EPMA measurement, the ratio of the peak intensity [La] of the Lα1 characteristic X-ray of lanthanum to the peak intensity [Sr] of the Lα1 characteristic X-ray of strontium should be constant.

Similarly, the ratio cobalt/iron of cobalt to iron constituting the B site should be constant at 0.2/0.8 i.e. 0.25 when the composition is completely uniform. Accordingly, in the EPMA measurement, the ratio of the peak intensity [Co] of the Kα1 characteristic X-ray of cobalt to the peak intensity [Fe] of the Kα1 characteristic X-ray of iron should be constant.

However, practically, the elements constituting the composite oxide particles are not completely uniformly distributed but are distributed with a non-uniformity at a certain extent i.e. with a dispersion of concentrations of the constituting elements.

With respect to the A site, there is a portion where the lanthanum concentration is higher than the desired composition and the strontium concentration is lower than the desired composition, and there is a portion where the lanthanum concentration is lower than the desired composition and the strontium concentration is higher than the desired composition.

With respect to the B site, there is a portion where the cobalt concentration is higher than the desired composition and the iron concentration is lower than the desired composition, and there is a portion where the cobalt concentration is lower than the desired composition and the iron concentration is higher than the desired composition.

The composite oxide fine particles having a composition with such a dispersion are subjected to EPMA measurement, and in a diagram illustrating a dispersion showing the peak intensity [Sr] of the Lα1 characteristic X-ray of strontium in the vertical axis and the peak intensity [La] of the Lα1 characteristic X-ray of lanthanum in the horizontal axis, [La] and [Sr] of the composite oxide particles having a high compositional uniformity of the present invention are present in a region represented by the formula (1):

$$a[La]-150 \leq [Sr] \leq a[La]+150 \quad (1)$$

Here, the coefficient a of [La] is a value which greatly depends on the composition of the composite oxide and satisfies $0.2 \leq a \leq 1.0$.

Further, in a diagram illustrating a dispersion showing the peak intensity [Fe] of the Kα1 characteristic X-ray of iron in the vertical axis and the peak intensity [Co] of the Kα1 characteristic X-ray of cobalt in the horizontal axis, [Fe] and [Co] of the composite oxide having a high compositional uniformity of the present invention are present in a region represented by the formula (2):

$$b[Co]-300 \leq [Fe] \leq b[Co]+300 \quad (2)$$

Here, the coefficient b of [Co] is a value which greatly depends on the composition of the composite oxide and satisfies $0.3 < b \leq 4.0$.

Further, as shown in the after-mentioned Comparative Example, a LSCF powder prepared by a conventional method has a greatly dispersed composition, and the degree of the dispersion evaluated by the peak intensities of the characteristic X-ray by the EPMA measurement indicates that the dispersion points determined by the peak intensities of the characteristic X-ray are present out of the ranges defined by the present invention.

Now, the process for producing the air electrode material for a solid oxide fuel cell having a composition represented by the formula (I) according to a preferred embodiment of the present invention will be described.

$$(La_{1-x}Sr_x)_aCo_yFe_{1-y}O_3 \quad (I)$$

(Preparation of Raw Material Powders)

As powders as raw materials of the air electrode material for a solid oxide fuel cell having a composition represented by the formula (I) $(La_{1-x}Sr_x)_aCo_yFe_{1-y}O_3$ according to a preferred embodiment of the present invention, commonly employed powders may suitably be used, and for example, an oxide, a hydroxide, a nitrate, a carbonate, an organic acid salt and the like containing each of La, Sr, Co and Fe may be mentioned.

Particularly in view of the environmental aspect and availability, preferred is a carbonate, a hydroxide or an oxide, and in view of high reactivity of the raw material, an organic acid salt such as a citrate is also preferred.

Further, as the raw material for one element, optional two or more compounds selected from the group consisting of an oxide, a hydroxide, a nitrate, a carbonate and an organic acid salt may be selected as the element source.

The above raw material powders are weighed so that the respective elements La, Sr, Co and Fe achieve the desired composition represented by the formula (I).

The respectively weighed raw material powders are preferably preliminarily pulverized to make particles fine, so that the dissolution reaction quickly proceeds. Further, a part or all of the powders may be preliminarily uniformly mixed. Mixing may be carried out by dry mixing, but preferably carried out by a wet mixing method, whereby a homogeneous raw material powder can be obtained in a relatively short time, and particularly, pulverization may be carried out simultaneously with mixing.

An apparatus to carry out the wet mixing method is not particularly limited, and is preferably one which can carry out pulverization simultaneously. For example, a ball mill, a bead mill, an attrition mill or a colloid mill is preferred. Among them, one which employs a grinding medium such as zirconia balls, for example a ball mill or a bead mill, is more preferably used. For example, the above grinding medium may be added to the raw material powders, followed by pulverization and mixing using a ball mill for from 12 to 24 hours. Pulverization and mixing by a grinding medium e.g. by a ball mill is preferred, whereby a stronger shear force can be given, and a more homogeneous raw material mixed powder is obtained.

(Organic Acid Aqueous Solution)

Separately, an aqueous solution of an organic acid is preliminarily prepared. The organic acid is not particularly limited so long as it reacts with the compounds each containing a metal element to form a complex and it can dissolve the complex, and is preferably at least one member selected from the group consisting of maleic acid, formic acid, acetic acid, lactic acid and malic acid. Particularly, at least one member selected from the group consisting of maleic acid, lactic acid and malic acid is preferably selected.

The concentration of the aqueous solution of the organic acid is not particularly limited, and in view of the operation workability and with a view to sufficiently increasing the reaction rate, it is from 10 to 70 wt %, preferably from 20 to 60 wt %, further preferably from 30 to 50 wt %.

Here, in a case where citric acid is used as the organic acid to form the raw materials into a solution, it is preferred to use citric acid and at least one organic acid other than citric acid, selected from the group consisting of maleic acid, formic acid, acetic acid, lactic acid and malic acid in combination, and the organic acid other than citric acid is more preferably at least one member selected from the group consisting of maleic acid, lactic acid and malic acid. Among them, use of citric acid and malic acid in combination is particularly preferred.

In a case where citric acid and at least one organic acid other than citric acid, selected from the group consisting of maleic acid, lactic acid and malic acid are used in combination, the molar ratio (the number of moles of citric acid)/(the number of moles of at least one organic acid selected from the group consisting of maleic acid, lactic acid and malic acid) of citric acid to at least one organic acid other than citric acid, selected from the group consisting of maleic acid, lactic acid and malic acid, is preferably from 1/10 to 10/1, further preferably from 1/3 to 3/1.

As the citric acid, any of anhydrous citric acid, citric acid monohydrate and a mixture of anhydrous citric acid and citric acid monohydrate may be used.

By use of citric acid and the organic acid other than citric acid in combination, the dissolution reaction (complex formation) will more easily proceed, and the effect is remarkable particularly when as the organic acid other than citric acid, at least one member selected from the group consisting of maleic acid, lactic acid and malic acid is used in combination. In the case of use of citric acid and malic acid in combination, in addition to the above effect to make the dissolution reaction easily proceed, an effect to stabilize a solution in which compounds each containing a metal element constituting the composite oxide are dissolved, will be obtained. That is, if an organic acid such as malic acid is used alone, if the solution in which the raw materials are dissolved is left to stand several days at room temperature, the compounds each containing a metal element constituting the composite oxide will re-precipitate, however, in the case of use of citric acid and malic acid in combination, the solution is stable as it is in a solution state.

In the present invention, when the compounds each containing a metal element constituting the composite oxide are formed into a solution with an aqueous solution of citric acid, an ammonium compound may further be used simultaneously. Use of citric acid and an ammonium compound in combination is preferred, whereby the dissolution reaction (complex formation) will more easily proceed. The ammonium compound is preferably at least one member selected from the group consisting of ammonia, ammonium bicarbonate, ammonium carbonate and an ammonium citrate. The ammonium citrate may, for example, be diammonium hydrogencitrate or triammonium citrate. The amount of the ammonium compound is not particularly limited so long as the raw material powders can be dissolved, and it is preferably from 1 to 10 times the number of moles of lanthanum ions, whereby the raw material powders will easily be dissolved.

The amount of use of the organic acid in the present invention is preferably at least an amount with which the organic acid can form a complex with the metal elements constituting the composite oxide and the complex can be sufficiently dissolved. Specifically, the amount of use of the organic acid is preferably from 2.3 to 10 times, particularly preferably from 2.3 to 5 times the total number of moles of La, Sr, Co and Fe contained in La, Sr, Co and Fe sources which are compounds each containing a metal element constituting the composite oxide. When the amount is at least 2.3 times, the metal elements will be substantially completely dissolved, and when it is at most 10 times, the cost of the organic acid can be reduced, and the amount of formation of carbon dioxide gas tends to be small, and excessive decrease of the oxygen concentration along with firing of the organic acid during firing can be suppressed.

(Dissolution Reaction)

The compounds each containing a raw material metal element constituting the composite oxide are dissolved in an aqueous solution of the above organic acid to form a solution. An apparatus to carry out such a dissolution reaction is not particularly limited, and for example, a tank reactor equipped with a stirring means, a heating means, a raw material powder supplying means and an organic acid aqueous solution supplying means, capable of making supplied raw material powders float without precipitating and of allowing the raw material powders to react with the organic acid in a floating state, is preferred. As the stirring means, a conventional stirring machine, for example, any of a paddle agitator, a marine propeller stirrer and a turbine impeller mixer may suitably be used. In the case of a small-scale reaction, a flask-shaped container provided with a stirring machine may be used.

The method of contacting the powders of the metal element-containing compounds with the organic acid aqueous solution is not particularly limited so long as the reaction will efficiently be carried out and finally a uniform solution can be obtained, since the dissolution reaction is understood as a solid-liquid different phase reaction in view of chemical engineering. Usually, preferred is a method in which the organic acid aqueous solution is charged in a reactor, and the raw material powders are added thereto with stirring, reacted and dissolved.

The raw material powders to be added may successively be added, or the raw material powders may preliminarily be mixed and the mixed powder is supplied all at once and reacted. Otherwise, such supply methods may be combined.

In a case where the raw material powders are successively added, first, a raw material powder containing one metal element e.g. a lanthanum oxide powder may be supplied to the organic acid aqueous solution, reacted and dissolved with heating, and then the other element compounds (e.g. strontium carbonate, cobalt carbonate, iron citrate and the like) are added and reacted all at once.

As the reaction temperature, the dissolution reaction is carried out preferably under heating to a certain extent, whereby the dissolution reaction will be promoted. The reaction temperature is usually from 30 to 100° C., preferably from 40 to 90° C., further preferably from 50 to 80° C. Further, the reaction time i.e. the time until which a uniform solution is formed may vary depending upon the temperature, the organic acid concentration, the type of the organic acid and the raw material element-containing compounds, their particles sizes, etc., and is usually from 10 minutes to 10 hours, preferably from 30 minutes to 5 hours, further preferably from about 1 to about 3 hours.

(Spray Drying, etc.)

In the present invention, the obtained solution is preferably dried by a spray dryer. By spray drying, the solution in which the respective raw material metal elements are substantially completely dissolved in the organic acid aqueous solution is supplied to a drying apparatus such as a flash dryer or a spray dryer and dried. The solution supplied to the drying apparatus is formed into fine droplets in the apparatus, which form a fluidized bed by heated air for drying, and the droplets are dried in an extremely short time while being transferred by the heated air, whereby a dry powder is obtained in a short time. As a result, precipitation due to a difference in the solubility among La, Sr, Co and Fe is suppressed, and the homogeneity of the respective metal elements La, Sr, Co and Fe in the dry powder will be high.

As an atomizer when a spray dryer is used, one having e.g. a rotating disk, a two-fluid nozzle or a pressure nozzle may properly be employed, and the temperature of the heated air for drying is preferably from 150 to 300° C. at the inlet and from about 100 to about 150° C. at the outlet.

By such spray drying, the solution in which all the raw material metal elements are dissolved to form a uniform phase is formed into fine droplets, and from the droplets moisture is evaporated and removed instantaneously or in a very short time, whereby a dry powder (mixed powder) having a solid phase with a uniform composition even at the micro level in principle precipitated is obtained.

The average particle size of the dry powder obtainable by spray drying is preferably from 5 to 100 μm, more preferably from 20 to 70 μm.

(Firing)

Then, the spray dried mixed powder is preferably put in a firing container and fired in a firing furnace. Firing basically preferably comprises three steps differing in the firing temperature i.e. crude firing, temporary firing and main firing, but may comprise two steps of crude firing and main firing, may comprises two steps of temporary firing and main firing, or may comprise one step of only main firing of sequentially increasing the temperature. The material of the firing container is not particularly limited, and for example, mullite or cordierite may be mentioned.

Of the firing furnace, a heat source may be an electric or gas shuttle kiln or in some cases, a roller hearth kiln or a rotary kiln and is not particularly limited.

(Crude Firing)

In the crude firing step, an operation of increasing the temperature of the firing furnace to the desired firing temperature of preferably from 300 to 600° C. at a temperature-raising rate of preferably from 20 to 200° C./hour is carried out. By the temperature-raising rate being at least 20° C./hour, the time until which the temperature reaches the desired firing temperature will be shortened, thus improving the productivity. Further, by the temperature-raising rate being at most 200° C./hour, chemical change of the reacting substances at each temperature will sufficiently proceed.

The firing temperature in crude firing is preferably from 300 to 600° C., more preferably from 350 to 550° C. By the firing temperature being at least 300° C., the carbon component is less likely to remain. Further, by the firing temperature being at most 600° C., an impurity phase is less likely to form in a product after main firing.

The firing time in crude firing is preferably from 4 to 24 hours, more preferably from 8 to 20 hours. By the firing time being at least 4 hours, the carbon component is less likely to remain. Further, if the firing time exceeds 24 hours, although there is no change in the product, the productivity tends to decrease, and accordingly it is preferably at most 24 hours. In crude firing, the temperature may be kept constant, for example at 400° C. for 8 hours, or may be increased for example from 300° C. to 400° C. at a rate of 20° C./hour.

The atmosphere in the firing furnace when crude firing is carried out is an oxygen-containing atmosphere, and is preferably the air atmosphere (in the air) or an atmosphere having an oxygen concentration of at most 21 vol %. If the oxygen concentration exceeds 21 vol %, the carbon component in the raw material mixed powder will burn and the oxidation reaction partially proceeds and as a result, the constituting elements in the product may unevenly be present in some cases, and accordingly an atmosphere having an oxygen concentration of at most 21 vol % is preferred.

After crude firing is carried out, the temperature is decreased to room temperature. The temperature-decreasing rate is preferably from 40 to 200° C./hour. By the temperature-decreasing rate being at least 40° C., the productivity will improve. Further, by the temperature-decreasing rate being at most 200° C./hour, the firing container used is less likely to be broken by thermal shock. Here, after the crude firing step, the subsequent temporary firing step may be carried out without temperature decrease when the firing container is not changed and when crushing is not carried out.

Then, the oxide obtained in the crude firing step is crushed as the case requires. Crushing is usually carried out by dry crushing using a pulverizer such as a cutter mill, a jet mill or an atomizer. The volume average particle size after crushing is preferably from 1 to 50 μm, more preferably from 1 to 20 μm.

(Temporary Firing)

Then, the crude-fired powder is subjected to temporary firing. In the temporary firing step, the temperature of the firing furnace is increased to the desired temporary firing temperature at a temperature-raising rate of from 50 to 800° C./hour, preferably from 50 to 400° C./hour. By the temperature-raising rate being at least 50° C./hour, the time until which the temperature reaches the desired firing temperature will be shortened, thus improving the productivity. Further, by the temperature-raising rate being at most 800° C./hour, the chemical change of the reacting substances at each temperature will sufficiently proceed.

The temperature in temporary firing is preferably from 500 to 800° C., more preferably from 500 to 700° C. By the temperature being at least 500° C., the carbon component is less likely to remain. Further, by the temperature being at most 800° C., the fired powder is less likely to be excessively sintered.

The firing time is preferably from 4 to 24 hours, more preferably from 8 to 20 hours. By the firing time being at least 4 hours, the carbon component is less likely to remain. Further, by the firing time being at most 24 hours, the productivity will improve without any change in the product.

The atmosphere in the firing furnace when temporary firing is carried out is preferably the same oxygen-containing atmosphere as the atmosphere at the time of crude firing. After temporary firing is carried out for a predetermined time, the temperature is decreased to room temperature. The temperature-decreasing rate is preferably from 40 to 200° C./hour. By the temperature-decreasing rate being at least 40° C./hour, the productivity will not be lowered. Further, by the temperature-decreasing rate being at most 200° C./hour, the firing container is less likely to be broken by thermal shock.

Then, the oxide obtained by temporary firing is crushed as the case requires in the same manner as after crude firing. Crushing is usually carried out by dry crushing using a pulverizer such as a cutter mill, a jet mill or an atomizer. The volume average particle size after crushing is preferably from 1 to 50 μm, more preferably from 1 to 20 μm.

(Main Firing)

Further, the temporary-fired powder is subjected to main firing. In the main firing step, the temperature in the firing furnace is increased to the desired firing temperature at a temperature-raising rate of from 50 to 800° C./hour, preferably from 50 to 400° C./hour. By the temperature-raising rate being at least 50° C./hour, the time until which the temperature reaches the desired firing temperature will be shortened, thus improving the productivity. Further, by the temperature-raising rate being at most 800° C./hour, such will not occur that the temperature reaches the desired firing temperature in such a condition that the chemical change of the reacting substances at each temperature does not sufficiently proceed and the reacting substances are in a non-uniform state, and accordingly by-products will not form in the fired product.

The temperature in main firing is preferably from 700 to 1,300° C., more preferably from 750 to 1,250° C. By the temperature being at least 700° C. and at most 1,300° C., the desired crystal phase will effectively form.

The firing time is preferably from 4 to 24 hours, more preferably from 5 to 20 hours. By the firing time being at least 4 hours, unreacted substances will not be mixed in the desired oxide, and a product in a single crystalline phase will be obtained. Further, by the firing time being at most 24 hours, the productivity will not be lowered without any change of the product.

The atmosphere in the firing furnace when main firing is carried out is preferably the same oxygen-containing atmosphere as crude firing or temporary firing. After main firing is carried out, the temperature is decreased to room temperature. The temperature-decreasing rate is preferably from 40 to 200° C./hour. By the temperature-decreasing rate being at least 40° C./hour, the productivity will not be lowered. Further, by the temperature-decreasing rate being at most 200° C./hour, the firing container used is less likely to be broken by thermal shock.

Then, the oxide obtained by main firing is crushed in the same manner as after crude firing. Crushing is usually carried out by dry crushing using a pulverizer such as a cutter mill, a jet mill or an atomizer. The volume average particle size of the powder after crushing is preferably from 1 to 50 μm, more preferably from 1 to 20 μm. Then, as the case requires, the powder may be pulverized by wet pulverization to adjust the particle size. The above crude firing, temporary firing and main firing may be continuously carried out without decreasing the temperature to room temperature after completion of each step or without carrying out crushing after firing. That is, temporary firing may be carried out continuously after crude firing, main firing may be carried out continuously after temporary firing, or three steps of crude firing, temporary firing and main firing may be carried out continuously.

(Molded Product, Sintered Product)

In the powder (fine particles) obtained by main firing, the respective fine particles have a completely uniform composition $(La_{1-x}Sr_x)_aCo_yFe_{1-y}O_3$ (LSCF) even at the micro level, and by sintering a molded product of the powder, the molded sintered product may suitably be used as the air electrode for a solid oxide fuel cell. That is, the molded sintered product takes over the highly uniform composition of the fine particles as it is, and accordingly a LSCF sintered product having an extremely uniform composition in principle is formed.

As a means to form a molded product and a sintered product, known means are employed. For example, first, a $(La_{1-x}Sr_x)_aCo_yFe_{1-y}O_3$ powder is mixed with a binder, the mixture is filled in a mold having a certain volume, and a pressure is applied from above to prepare a molded product. The method to apply a pressure may be mechanical uniaxial press or cold isostatic press (CIP) or the like and is not particularly limited.

Then, the molded product is subjected to heat treatment to obtain a sintered product. The heat treatment temperature is preferably from 1,000 to 1,450° C., more preferably from 1,000 to 1,300° C. By the heat treatment temperature being at least 1,000° C., mechanical strength of the molded product will sufficiently be maintained, and by the heat treatment temperature being at most 1,450° C., it is unlikely that a part of the formed LSCF is decomposed to form impurities, and that the homogeneity of the elements constituting the lanthanum strontium cobalt iron composite oxide of the present invention will be given. The heat treatment time is preferably from 2 to 24 hours.

EXAMPLES

Now, the present invention will be described with reference to comparison between Examples of the present invention (Examples 1 to 6) and Comparative Examples (Comparative Examples 1 to 3). However, it is understood that such Examples are merely examples of the embodiment of the present invention, and the present invention is by no means restricted to such specific Examples.

In the following, "%" means "mass (or weight) %" unless otherwise specified.

Example 1

(1) (Preparation of Raw Material Powders and Organic Acid)

Raw material powders were weighed to form $La_{0.6}Sr_{0.4}Co_{0.2}Fe_{0.8}O_3$.

That is, as shown in Table 1, 356.8 g of lanthanum oxide ($La_2O_3$) as a La source, 215.7 g of strontium carbonate ($SrCO_3$) as a Sr source, 92.16 g of cobalt carbonate ($CoCO_3$) manufactured by NIHON KAGAKU SANGYO CO., LTD. having a Co content of 46.58% as a Co source and 876.7 g of iron citrate ($FeC_6H_5O_7 \cdot nH_2O$) having a Fe content of 18.56% as a Fe source were weighed (La:Sr:Co:Fe of 0.6:0.4:0.2:0.8 by the atomic ratio).

Separately, in a 20 L (liter) separable flask, 2,908 g of citric acid monohydrate in an amount of three times the number of moles of La ions, twice respectively the numbers of moles of Sr ions and Co ions and equal to the number of moles of Fe ions since 1 mol of citric acid was already present in iron citrate, was added to 4.0 L of pure water of 55° C. to prepare a citric acid aqueous solution. 1,037 g (6 times the number of moles of La ions) of ammonium bicarbonate was added thereto, and the compounds were dissolved in a stirring tank reactor at 28° C.

(2) (Intermediate Product and Drying)

Lanthanum oxide was charged to the citric acid aqueous solution to which ammonium bicarbonate was added, the mixture was heated to 70° C. and reacted at the temperature for 2 hours. Lanthanum oxide was completely dissolved, and a colorless and transparent solution was obtained.

Strontium carbonate, cobalt carbonate and iron citrate were added to the solution, followed by reaction at 55° C. further for 2 hours. The respective metal salts were completely dissolved, and a blackish brown transparent solution was obtained.

After completion of the reaction, the obtained solution was dried by a spray dryer to obtain a dry powder of a composite citrate as an intermediate product. As the spray dryer, BDP-10 Spray Bag Dryer (manufactured by OHKAWARA KAKOHKI CO., LTD.) was used, and drying was carried out under conditions of an inlet temperature of 200° C., an outlet temperature of 125° C. and an atomizer rotating speed of 15,000 rpm.

(3) (Crude Firing, Temporary Firing and Main Firing)

The obtained dry powder was filled in four 30 cm square mullite crucibles and fired in the air in an electric furnace at 400° C. for 10 hours to decompose the organic substances (crude firing). The temperature-raising rate from room temperature to 400° C. was 400° C./3 hours, and the temperature-decreasing rate from 400° C. to room temperature was 400° C./4 hours.

The obtained crude-fired powder was filled in one 30 cm square mullite crucible and fired in the air in an electric furnace at 600° C. for 10 hours to decompose remaining carbon (temporary firing). The temperature-raising rate from room temperature to 500° C. was 500° C./3 hours, the temperature-raising rate to 600° C. was 100° C./2 hours, and the temperature-decreasing rate from 600° C. to room temperature was 600° C./6 hours, and a temporary-fired powder was obtained.

The temporary-fired powder was filled in one 30 cm square mullite crucible and fired in the air in an electric furnace at 1,000° C. for 6 hours to obtain the desired LSCF final powder ($La_{0.6}Sr_{0.4}Co_{0.2}Fe_{0.8}O_3$) (main firing). The temperature-raising rate from room temperature to 700° C. was 700° C./4 hours, the temperature-raising rate to 1,000° C. was 100° C./1 hour, and the temperature-raising rate from 1,000° C. to room temperature was 100° C./1 hour. After main firing, the fired product was crushed to obtain a $La_{0.6}Sr_{0.4}Co_{0.2}Fe_{0.8}O_3$ powder.

(4) (Component Analysis)

(i) XRD Analysis

A small amount of the $La_{0.6}Sr_{0.4}Co_{0.2}Fe_{0.8}O_3$ final powder was collected and subjected to powder X-ray diffraction measurement using CuKα as an X-ray source to identify the crystal phase. For the X-ray diffraction measurement, RINT2200V manufactured by Rigaku Corporation was used. As a result, the powder was confirmed to have a perovskite structure having rhombohedral crystals (113).

(ii) EPMA Analysis

Further, the above powder was subjected to EPMA analysis, and the peak intensities of the $L\alpha1$ characteristic X-ray of lanthanum, the $L\alpha1$ characteristic X-ray of strontium, the $K\alpha1$ characteristic X-ray of iron and the $K\alpha1$ characteristic X-ray of cobalt were measured by the unit of count. A measurement sample was prepared by embedding the powder in an epoxy resin and mechanically polished to prepare a cross section, and coating the cross section with carbon in a thickness of 30 nm.

For measurement, FE-EPMA JXA-8500F manufactured by JEOL Ltd. was used, electron beam applied to the measurement sample was accelerated at 15 kV, and measurement was carried out under conditions of an irradiation current of 30 nA and a probe diameter of 1 μm. The characteristic X-ray was measured in a range (250×250 μm) of 500×500 point each point being a 0.5 μm square, and in each point, the measurement time for the specific X-ray of each element was 50 milliseconds. Further, the cumulated number was one.

Further, for spectroscopy of the $L\alpha1$ characteristic X-ray of lanthanum and the $L\alpha1$ characteristic X-ray of strontium, PETJ and TAP were respectively used as the analyzing crystals, and for spectroscopy of the $K\alpha1$ characteristic X-ray of iron and the $K\alpha1$ characteristic X-ray of cobalt, LIFH was used.

Figure 1:
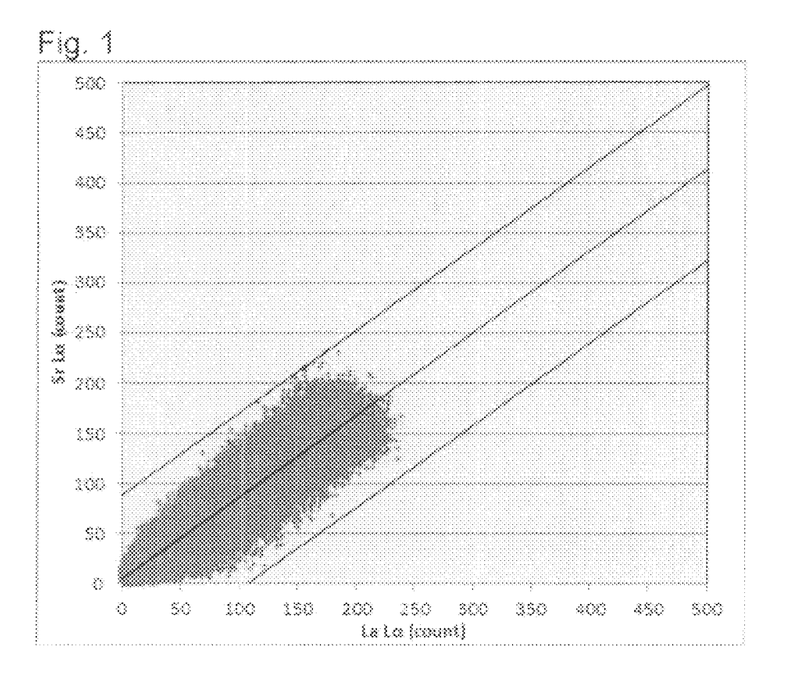
FIG. 1 is a dispersion diagram illustrating a composition distribution showing the peak intensity [Sr] of the Lα1 characteristic X-ray of strontium and the peak intensity [La] of the Lα1 characteristic X-ray of lanthanum of LSCF fine particles in Example 1 in axes.

FIG. 1 is a diagram showing the peak intensity [Sr] of the $L\alpha1$ characteristic X-ray of strontium as obtained by the EPMA measurement of the above powder in the vertical axis and the peak intensity [La] of the $L\alpha1$ characteristic X-ray of lanthanum in the horizontal axis. The dispersion point showing the composition distribution, determined by the peak intensity [Sr] of the $L\alpha1$ characteristic X-ray of strontium and the peak intensity [La] of the $L\alpha1$ characteristic X-ray of lanthanum, is found to be distributed in a region represented by the formula (3) in the vicinity of [Sr]=0.8200[La]+4.3384:

$$0.82[La]-88 \leq [Sr] \leq 0.82[La]+88 \quad (3)$$

Figure 2:
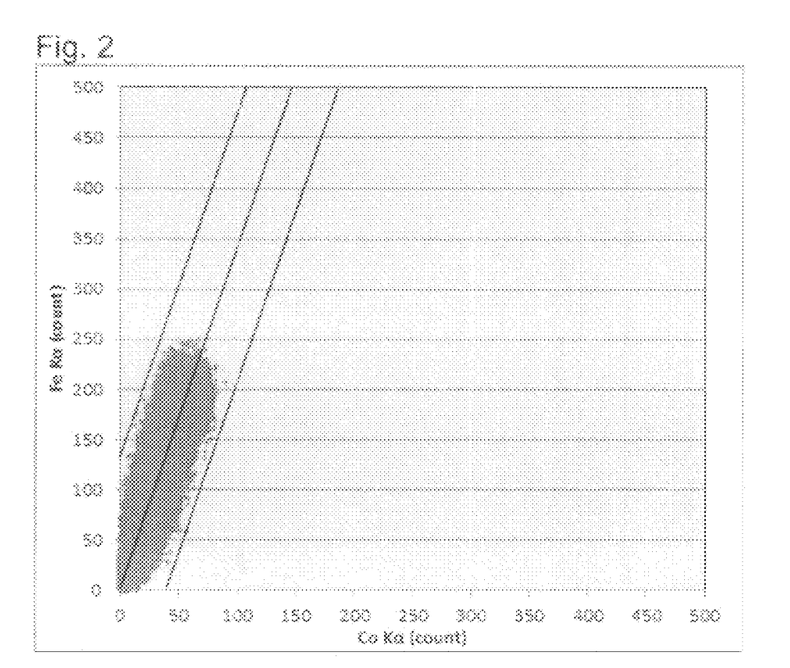
FIG. 2 is a dispersion diagram illustrating a composition distribution showing the peak intensity [Fe] of the Kα1 characteristic X-ray of iron and the peak intensity [Co] of the Kα1 characteristic X-ray of cobalt of LSCF fine particles in Example 1 in axes.

Further, FIG. 2 is a diagram showing the peak intensity [Fe] of the $K\alpha1$ characteristic X-ray of iron as obtained by the EPMA measurement of the powder in the vertical axis and the peak intensity [Co] of the $K\alpha1$ characteristic X-ray of cobalt in the horizontal axis. The dispersion point showing the composition distribution, determined by the peak intensity [Fe] of the $K\alpha1$ characteristic X-ray of iron and the peak intensity [Co] of the $K\alpha1$ characteristic X-ray of cobalt is found to be distributed in a region represented by the formula (4) in the vicinity of [Fe]=3.4104[Co]+1.7013:

$$3.4[Co]-133 \leq [Fe] \leq 3.4[Co]+133 \quad (4)$$

(iii) Particle Size Distribution Measurement

A small amount of $La_{0.6}Sr_{0.4}Co_{0.2}Fe_{0.8}O_3$ was dispersed in deionized water as follows to prepare a sample. Using as a dispersing agent an aqueous solution having a concentration of 0.24 wt % using sodium diphosphate decahydrate manufactured by Wako Pure Chemical Industries, Ltd., 10 ml of a dispersion was prepared from about 0.001 g of $La_{0.6}Sr_{0.4}Co_{0.2}Fe_{0.8}O_3$ and the dispersing agent, and the dispersion was irradiated with ultrasonic waves for 3 minutes to prepare a sample. Using the sample, the particle size distribution of $La_{0.6}Sr_{0.4}Co_{0.2}Fe_{0.8}O_3$ was measured by a laser diffraction/scattering type particle size distribution analyzer LA-920 manufactured by HORIBA Ltd. Immediately before the measurement, an ultrasonic treatment at an output of 30 W was carried out for 180 seconds. As a result, the volume average particle size $D_{50}$ was 15.1 μm.

Example 2

(1) (Preparation of Raw Material Powders and Organic Acid)

Raw material powders were weighed to form $La_{0.6}Sr_{0.4}Co_{0.2}Fe_{0.8}O_3$ in the same manner as in Example 1 (see Table 1).

Separately, in a 20 L separable flask, 1,837 g of citric acid monohydrate, 1,954 g of malic acid and 4.0 L of pure water were added to prepare an aqueous solution comprising a mixture of citric acid and malic acid, which was dissolved at 28° C. in a stirring tank reactor without adding an ammonium source such as ammonium bicarbonate.

(2) (Intermediate Product and Drying)

Lanthanum oxide was charged to the above aqueous solution of a mixture of citric acid and malic acid, and the mixture was heated to 55° C., followed by reaction at the temperature for 2 hours. Lanthanum oxide was completely dissolved, and a colorless transparent solution was obtained.

To the solution, strontium carbonate, cobalt carbonate and iron citrate were added, followed by reaction at 55° C. further for 2 hours. The metal salts were completely dissolved, and a blackish brown transparent solution was obtained.

After completion of the reaction, the obtained solution was dried by a spray dryer to obtain a dry powder of a composite organic acid salt as an intermediate product. As the spray dryer, the same BDP-10 Spray Bag Dryer (manufactured by OHKAWARA KAKOHKI CO., LTD.) as in Example 1 was used, and drying was carried out under the same conditions as in Example 1.

(3) (Crude Firing, Temporary Firing and Main Firing)

The obtained dry powder was filled in four 30 cm square mullite crucibles, and subjected to crude firing in the air in an electric furnace in the same manner as in Example 1 and then to temporary firing and further to main firing.

After main firing, the fired powder was crushed to obtain a $La_{0.6}Sr_{0.4}Co_{0.2}Fe_{0.8}O_3$ powder.

(4) (Component Analysis)

(i) XRD Analysis

A small amount of the $La_{0.6}Sr_{0.4}Co_{0.2}Fe_{0.8}O_3$ final powder was collected, and subjected to powder X-ray diffraction measurement in the same manner as in Example 1. As a result, the powder was confirmed to have a perovskite structure having rhombohedral crystals (113).

(ii) EPMA Analysis

Further, the powder was subjected to analysis by EPMA in the same manner as in Example 1, and peak intensities of the $L\alpha1$ characteristic X-ray of lanthanum, the $L\alpha1$ characteristic X-ray of strontium, the $K\alpha1$ characteristic X-ray of iron and the $K\alpha1$ characteristic X-ray of cobalt were measured by the unit of count.

The dispersion point showing the composition distribution, determined by the peak intensity [Sr] of the $L\alpha1$ characteristic X-ray of strontium and the peak intensity [La] of the $L\alpha1$ characteristic X-ray of lanthanum of the powder was distributed in a region represented by the formula (5) in the vicinity of [Sr]=0.8581[La]+3.8959:

$$0.86[La]-108 \leq [Sr] \leq 0.86[La]+108 \quad (5)$$

Further, the distribution point showing the composition distribution, determined by the peak intensity [Fe] of the $K\alpha1$ characteristic X-ray of iron and the peak intensity [Co] of the $K\alpha1$ characteristic X-ray of cobalt of the powder was distributed in a region represented by the formula (6) in the vicinity of [Fe]=3.2425[Co]+3.3556:

$$3.2[Co]-186 \leq [Fe] \leq 3.2[Co]+186 \quad (6)$$

(iii) Particle Size Distribution Measurement

Particle size distribution measurement was carried out in the same manner as in Example 1. As a result, the volume average particle size $D_{50}$ of $La_{0.6}Sr_{0.4}Co_{0.2}Fe_{0.8}O_3$ was 15.7 µm.

Comparative Example 1

(1) (Intermediate Product Obtained by Adding Raw Material Powders and Organic Acid)

Raw material powders were weighed to form $La_{0.6}Sr_{0.4}Co_{0.2}Fe_{0.8}O_3$ in the same manner as in Example 1 (see Table 1).

Separately, 2 L (liter) of pure water was added into a 20 L separable flask, lanthanum oxide was added and the liquid temperature was maintained at 50° C., and hydration reaction ($La_2O_3+3H_2O \rightarrow 2La(OH)_3$) was carried out for 2 hours. To the obtained mixture, strontium carbonate, cobalt carbonate and iron citrate were added and dispersed for one hour. 816 g of citric acid monohydrate was further added, followed by reaction for 2 hours to obtain a brown slurry.

The amount of the citric acid monohydrate required is equal respectively to the numbers of moles of La ions and Co ions and 2/3 time the number of moles of Sr ions.

(2) (Drying of Intermediate Product)

The prepared slurry obtained by adding citric acid monohydrate was put in a stainless steel vat, and dried one day in a shelf dryer set at 110° C.

(3) (Crude Firing, Temporary Firing and Main Firing)

The obtained dry powder was filled in four 30 cm square mullite crucibles, and subjected to crude firing in the air in an electric furnace in the same manner as in Example 1 and then to temporary firing and further to main firing at 600° C. for 6 hours.

The temperature program of main firing was such that the temperature-raising rate from room temperature to 600° C. was 600° C./4 hours, and the temperature-decreasing rate from 600° C. to room temperature was 100° C./1 hour. After main firing, the fired powder was crushed to obtain a $La_{0.6}Sr_{0.4}Co_{0.2}Fe_{0.8}O_3$ powder.

(4) (Component Analysis)

(i) XRD Analysis

A small amount of the $La_{0.6}Sr_{0.4}Co_{0.2}Fe_{0.8}O_3$ final powder was collected, and subjected to powder X-ray diffraction measurement in the same manner as in Example 1. As a result, the powder comprised 77.9 wt % of rhombohedral crystals (113), 19.3 wt % of $SrCO_3$ and 2.8 wt % of $La_2O_2CO_3$ and contained a large quantity of impurity phases.

(ii) EPMA Analysis

Further, the powder was subjected to EPMA analysis in the same manner as in Example 1, and peak intensities of the $L\alpha 1$ characteristic X-ray of lanthanum, the $L\alpha 1$ characteristic X-ray of strontium, the $K\alpha 1$ characteristic X-ray of iron and the $K\alpha 1$ characteristic X-ray of cobalt were measured by the unit of count.

Figure 3:
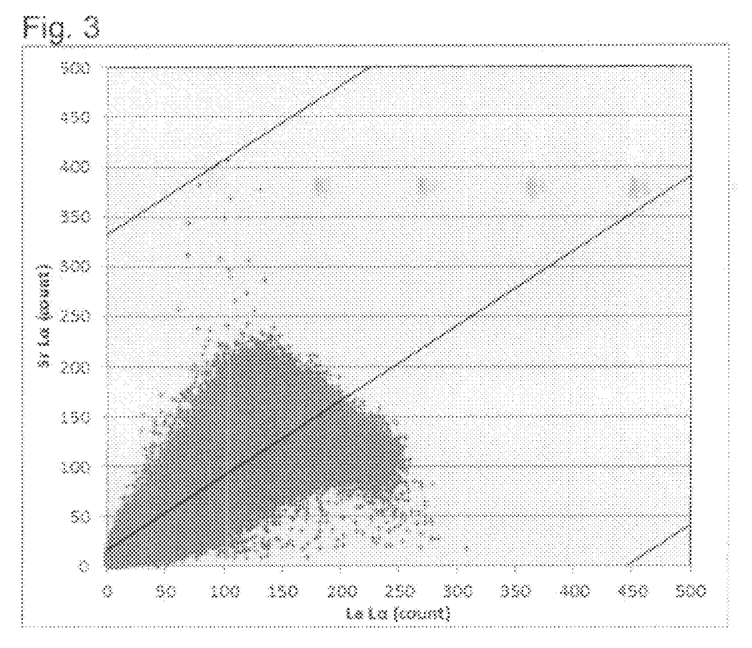
FIG. 3 is a dispersion diagram illustrating a composition distribution showing the peak intensity [Sr] of the Lα1 characteristic X-ray of strontium and the peak intensity [La] of the Lα1 characteristic X-ray of lanthanum of LSCF fine particles in Comparative Example 1 in axes.

FIG. 3 is a diagram showing the peak intensity [Sr] of the $L\alpha 1$ characteristic X-ray of strontium as obtained by EPMA measurement of the powder in the vertical axis and the peak intensity [La] of the $L\alpha 1$ characteristic X-ray of lanthanum in the horizontal axis. The dispersion point showing the composition distribution, determined by the peak intensity [Sr] of the $L\alpha 1$ characteristic X-ray of strontium and the peak intensity [La] of the $L\alpha 1$ characteristic X-ray of lanthanum is found to be distributed in a region represented by the formula (7) in the vicinity of [Sr]=0.7483[La]+16.8516:

$$0.75[La]-332 \leq [Sr] \leq 0.75[La]+332 \quad (7)$$

Figure 4:
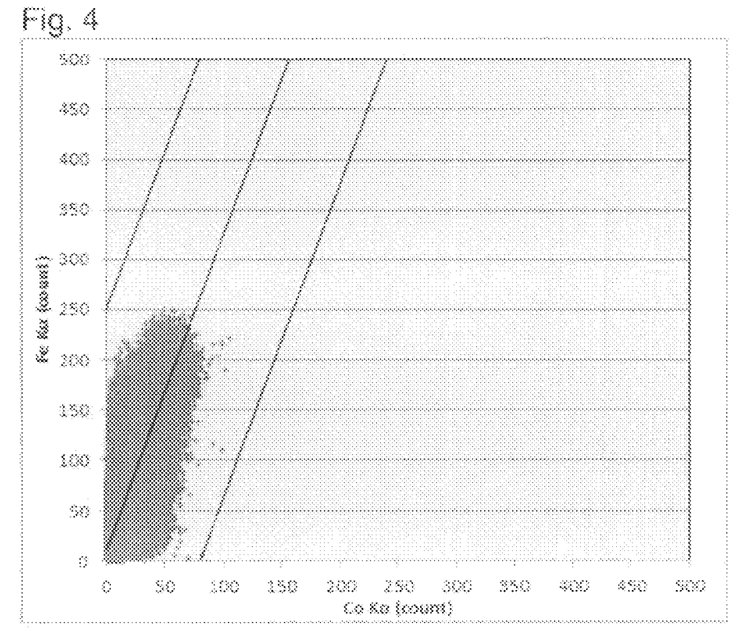
FIG. 4 is a dispersion diagram illustrating a composition distribution showing the peak intensity [Fe] of the Kα1 characteristic X-ray of iron and the peak intensity [Co] of the Kα1 characteristic X-ray of cobalt of LSCF fine particles in Comparative Example 1 in axes.

Further, the FIG. 4 is a diagram showing the peak intensity [Fe] of the $K\alpha 1$ characteristic X-ray of iron as obtained by the EPMA measurement of the powder in the vertical axis and the peak intensity [Co] of the $K\alpha 1$ characteristic X-ray of cobalt in the horizontal axis. The dispersion point showing the composition distribution, determined by the peak intensity [Fe] of the $K\alpha 1$ characteristic X-ray of iron and the peak intensity [Co] of the $K\alpha 1$ characteristic X-ray of cobalt, is found to be distributed in a region represented by the formula (8) in the vicinity of [Fe]=3.1284[Co]+12.3446:

$$3.1[Co]-250 \leq [Fe] \leq 3.1[Co]+250 \quad (8)$$

(iii) Particle Size Distribution Measurement

Particle size distribution measurement was carried out in the same manner as in Example 1. As a result, the volume average particle size $D_{50}$ of $La_{0.6}Sr_{0.4}Co_{0.2}Fe_{0.8}O_3$ was 15.3 µm.

Comparative Example 2

(1) The same operation as in Comparative Example 1 was carried out except that main firing was carried out at 1,200° C. for 6 hours, to obtain a final powder represented as $La_{0.6}Sr_{0.4}Co_{0.2}Fe_{0.8}O_3$ (see Table 1).

The temperature program of main firing was such that the temperature-raising rate from room temperature to 700° C. was 700° C./4 hours, the temperature-raising rate to 1,000° C. was 100° C./1 hour, the temperature-raising rate to 1,200° C. was 200° C./3 hours, and the temperature-decreasing rate from 1,200° C. to room temperature was 100° C./1 hour.

(2) (Component Analysis)

(i) XRD Analysis

A small amount of the $La_{0.6}Sr_{0.4}Co_{0.2}Fe_{0.8}O_3$ final powder was collected, and subjected to powder X-ray diffraction measurement in the same manner as in Example 1. As a result, the powder was confirmed to have a perovskite structure having rhombohedral crystals (113).

(ii) EPMA Analysis

Further, the powder was subjected to EPMA analysis in the same manner as in Example 1, and peak intensities of the $L\alpha 1$ characteristic X-ray of lanthanum, the $L\alpha 1$ characteristic X-ray of strontium, the $K\alpha 1$ characteristic X-ray of iron and the $K\alpha 1$ characteristic X-ray of cobalt were measured by the unit of count.

The dispersion point showing the composition distribution, determined by the peak intensity [Sr] of the $L\alpha 1$ characteristic X-ray of strontium and the peak intensity [La] of the $L\alpha 1$ characteristic X-ray of lanthanum of the powder is distributed in a region represented by the formula (9) in the vicinity of [Sr]=0.7546[La]+5.8214:

$$0.75[La]-157 \leq [Sr] \leq 0.75[La]+157 \quad (9)$$

Further, the dispersion point showing the composition distribution, determined by the peak intensity [Fe] of the $K\alpha 1$ characteristic X-ray of iron and the peak intensity [Co] of the $K\alpha 1$ characteristic X-ray of cobalt of the powder was distributed in a region represented by the formula (10) in the vicinity of [Fe]=3.1912[Co]+9.8977:

$$3.2[Co]-1309 \leq [Fe] \leq 3.2[Co]+1309 \quad (10)$$

(iii) Particle Size Distribution Measurement

Particle size distribution measurement was carried out in the same manner as in Example 1. As a result, the volume average particles size $D_{50}$ of $La_{0.6}Sr_{0.4}Co_{0.2}Fe_{0.8}O_3$ was 15.5 µm.

Comparative Example 3

(1) Weighing and Mixing of Raw Material Powders

Raw material powders were weighed to form $La_{0.6}Sr_{0.4}Co_{0.2}Fe_{0.8}O_3$ in the same manner as in Example 1 except that 234.0 g of iron oxide ($Fe_2O_3$) was used instead of iron citrate as the Fe source (see Table 1).

The weighed raw material powders were put in a nylon pot having an internal capacity of 5 L, mixed in a ball mill for 24 hours together with 10 kg of zirconia balls of 5 mm in diameter and 2.2 L of deionized water and dried in a dryer set at 110° C. for 24 hours to obtain a raw material mixed powder.

(2) (Crude Firing, Temporary Firing and Main Firing)

The obtained raw material mixed powder was filled in four 30 cm square mullite crucibles, and subjected to crude firing in the air in an electric furnace in the same manner as in Example 1 and then to temporary firing and further to main firing at 1,100° C. for 6 hours.

The temperature program of main firing was such that the temperature-raising rate from room temperature to 1,100° C. was 1,100° C./6 hours, and the temperature-decreasing rate from 1,100° C. to room temperature was 100° C./1 hour. After main firing, the fired powder was crushed to obtain a $La_{0.6}Sr_{0.4}Co_{0.2}Fe_{0.8}O_3$ powder.

(3) (Component Analysis)

(i) XRD Analysis

A small amount of the $La_{0.6}Sr_{0.4}Co_{0.2}Fe_{0.8}O_3$ final powder was collected, and subjected to powder X-ray diffraction measurement in the same manner as in Example 1. As a result, the powder was confirmed to have a perovskite structure having rhombohedral crystals (113).

(ii) EPMA Analysis

Further, the powder was subjected to EPMA analysis in the same manner as in Example 1, and peak intensities of the $L\alpha 1$ characteristic X-ray of lanthanum, the $L\alpha 1$ characteristic X-ray of strontium, the $K\alpha 1$ characteristic X-ray of iron and the $K\alpha 1$ characteristic X-ray of cobalt were measured by the unit of count.

Figure 5:
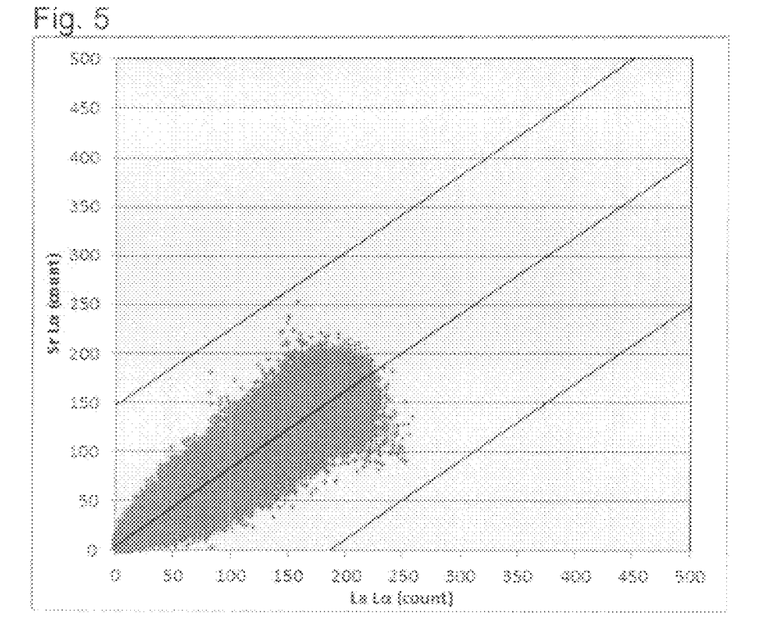
FIG. 5 is a dispersion diagram illustrating a composition distribution showing the peak intensity [Sr] of the Lα1 characteristic X-ray of strontium and the peak intensity [La] of the Lα1 characteristic X-ray of lanthanum of LSCF fine particles in Comparative Example 3 in axes.

FIG. 5 is a diagram showing the peak intensity [Sr] of the $L\alpha 1$ characteristic X-ray of strontium as obtained by EPMA measurement of the powder in the vertical axis and the peak intensity [La] of the $L\alpha 1$ characteristic X-ray of lanthanum in the horizontal axis.

The dispersion point showing the composition distribution, determined by the peak intensity [Sr] of the $L\alpha 1$ characteristic X-ray of strontium and the peak intensity [La] of the $L\alpha 1$ characteristic X-ray of lanthanum is found to be distributed in a region represented by the formula (11) in the vicinity of [Sr]=0.7883[La]+4.6565:

$$0.79[La]-146 \leq [Sr] \leq 0.79[La]+146 \quad (11)$$

Figure 6:
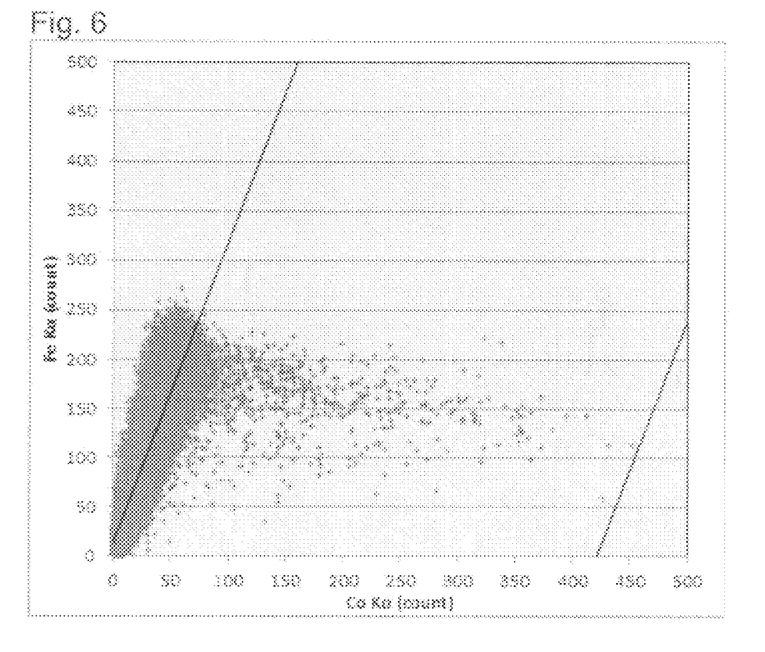
FIG. 6 is a dispersion diagram illustrating a composition distribution showing the peak intensity [Fe] of the Kα1 characteristic X-ray of iron and the peak intensity [Co] of the Kα1 characteristic X-ray of cobalt of LSCF fine particles in Comparative Example 3 in axes.

Further, the FIG. 6 is a diagram showing the peak intensity [Fe] of the $K\alpha 1$ characteristic X-ray of iron as obtained by the EPMA measurement of the powder in the vertical axis and the peak intensity [Co] of the $K\alpha 1$ characteristic X-ray of cobalt in the horizontal axis.

The dispersion point showing the composition distribution, determined by the peak intensity [Fe] of the $K\alpha 1$ characteristic X-ray of iron and the peak intensity [Co] of the $K\alpha 1$ characteristic X-ray of cobalt in FIG. 6, is found to be distributed in a region represented by the formula (12) in the vicinity of [Fe]=3.0452[Co]+13.1548:

$$3.1[Co]-1283 \leq [Fe] \leq 3.1[Co]+1283 \quad (12)$$

(iii) Particle Size Distribution Measurement

Particle size distribution measurement was carried out in the same manner as in Example 1. As a result, the volume average particle size $D_{50}$ of $La_{0.6}Sr_{0.4}Co_{0.2}Fe_{0.8}O_3$ was 14.8 µm.

Example 3

(1) (Preparation of Raw Material Powders and Organic Acid)

Raw material powders were weighed to form $La_{0.8}Sr_{0.2}Co_{0.2}Fe_{0.8}O_3$. That is, 847.1 g of lanthanum carbonate ($L_2(CO_3)_3 \cdot 8H_2O$) as a La source, 102.3 g of strontium carbonate ($SrCO_3$) as a Sr source, 65.17 g of cobalt hydroxide ($Co(OH)_2$) as a Co source and 338.7 g of hydrated iron hydroxide ($Fe(OH)_3$) having a Fe content of 45.58% as a Fe source (La:Sr:Co:Fe of 0.8:0.2:0.2:0.8 by the atomic ratio) were weighed. Separately, into a 20 L separable flask, 1,910 g of maleic acid and 8.0 L (liter) of pure water were added to prepare a maleic acid aqueous solution, which was dissolved at 55° C. with stirring without adding an ammonium source such as ammonium bicarbonate.

(2) (Intermediate Product and Drying)

To the above maleic acid aqueous solution, lanthanum carbonate, strontium carbonate, cobalt hydroxide and iron hydroxide were added and heated to 70° C., followed by reaction at the temperature for 2 hours. The metal salts were completely dissolved, and a blackish brown transparent solution was obtained.

After completion of the reaction, the obtained solution was dried in a spray dryer to obtain a dry powder of a composite maleate as an intermediate product. As the spray dryer, the same BDP-10 Spray Bag Dryer (manufactured by OHKAWARA KAKOHKI CO., LTD.) as in Example 1 was used, and drying was carried out under the same conditions as in Example 1.

(3) (Crude Firing, Temporary Firing and Main Firing)

The obtained dry powder was subjected to crude firing and temporary firing under the same conditions as in Example 1.

The temporary-fired powder was filled in one 30 cm square mullite crucible, and fired in the air in an electric furnace at 1,200° C. for 6 hours and crushed to obtain a LSCF final powder ($La_{0.8}Sr_{0.2}Co_{0.2}Fe_{0.8}O_3$) (main firing). The temperature-raising rate from room temperature to 700° C. was 700° C./4 hours, the temperature-raising rate to 1,200° C. was 100° C./1 hour, and the temperature-decreasing rate from 1,200° C. to room temperature was 100° C./1 hour.

(4) (Component Analysis)

(i) XRD Analysis

A small amount of the $La_{0.8}Sr_{0.2}Co_{0.2}Fe_{0.8}O_3$ final powder was collected, and subjected to powder X-ray diffraction measurement using CuKα as an X-ray source to identify the crystal phase. For X-ray diffraction measurement, the same RINT2200V manufactured by Rigaku Corporation as in Example 1 was used. As a result, the powder was confirmed to have a perovskite structure having rhombohedral crystals (113).

(ii) EPMA Analysis

Further, the powder was subjected to EPMA analysis in the same manner as in Example 1, and peak intensities of the $L\alpha 1$ characteristic X-ray of lanthanum, the $L\alpha 1$ characteristic X-ray of strontium, the $K\alpha 1$ characteristic X-ray of iron and the $K\alpha 1$ characteristic X-ray of cobalt were measured by the unit of count.

The dispersion point showing the composition distribution, determined by the peak intensity [Sr] of the $L\alpha 1$ characteristic X-ray of strontium and the peak intensity [La] of the $L\alpha 1$ characteristic X-ray of lanthanum of the powder was distributed in a region represented by the formula (13) in the vicinity of $[Sr]=0.3135[La]+4.6452$:

$$0.31[La]-115 \leq [Sr] \leq 0.31[La]+115 \quad (13)$$

Further, the dispersion point showing the composition distribution, determined by the peak intensity [Fe] of the K$\alpha$1 characteristic X-ray of iron and the peak intensity [Co] of the K$\alpha$1 characteristic X-ray of cobalt of the powder was distributed in a region represented by the formula (14) in the vicinity of $[Fe]=2.4330[Co]+17.7364$:

$$2.4[Co]-267 \leq [Fe] \leq 2.4[Co]+267 \quad (14)$$

(iii) Particle Size Distribution Measurement

Particle size distribution measurement was carried out in the same manner as in Example 1. As a result, the volume average particle size $D_{50}$ of $La_{0.8}Sr_{0.2}Co_{0.2}Fe_{0.8}O_3$ was 15.9 μm.

Example 4

(1) (Preparation of Raw Material Powders and Organic Acid)

Raw material powders were weighed to form $La_{0.8}Sr_{0.2}Co_{0.8}Fe_{0.2}O_3$.

That is, 521.5 g of lanthanum hydroxide $(La(OH)_3)$ as a La source, 101.5 g of strontium carbonate $(SrCO_3)$ as a Sr source, 347.0 g of cobalt carbonate $(CoCO_3)$ manufactured by NIHON KAGAKU SANGYO CO., LTD. having a Co content of 46.58% as a Co source and 84.00 g of hydrated iron hydroxide $(Fe(OH)_3)$ having a Fe content of 45.58% as a Fe source (La:Sr:Co:Fe of 0.8:0.2:0.8:0.2 by the atomic ratio) were weighed. Separately, into a 20 L separable flask, 2,985 g of lactic acid having a purity of 90% and 4.0 L (liter) of pure water were added to prepare a lactic acid aqueous solution, which was dissolved at 50° C. with stirring without adding an ammonium source such as ammonium bicarbonate.

(2) (Intermediate Product and Drying)

To the above lactic acid aqueous solution, lanthanum carbonate, strontium carbonate, cobalt carbonate and hydrated iron hydroxide were added, followed by reaction at 50° C. for 2 hours. The metal salts were completely dissolved, and a blackish brown transparent solution was obtained.

After completion of the reaction, the obtained solution was dried in a spray dryer to obtain a dry powder of a composite lactate as an intermediate product. As the spray dryer, the same BDP-10 Spray Bag Dryer (manufactured by OHKAWARA KAKOHKI CO., LTD.) as in Example 1 was used, and drying was carried out under the same conditions as in Example 1.

(3) (Crude Firing, Temporary Firing and Main Firing)

The obtained dry powder was subjected to crude firing and temporary firing under the same conditions as in Example 1. The temporary-fired powder was filled in one 30 cm square mullite crucible, and fired in the air in an electric furnace at 750° C. for 6 hours to obtain the desired LSCF final powder $(La_{0.8}Sr_{0.2}Co_{0.8}Fe_{0.2}O_3)$ (main firing).

The temperature-raising rate from room temperature to 750° C. was 750° C./4 hours, and the temperature-decreasing rate from 750° C. to room temperature was 100° C./1 hour.

(4) (Component Analysis)

(i) XRD Analysis

A small amount of the $La_{0.8}Sr_{0.2}Co_{0.8}Fe_{0.2}O_3$ final powder was collected, and subjected to powder X-ray diffraction measurement using CuK$\alpha$ as an X-ray source to identify the crystal phase. For X-ray diffraction measurement, the same RINT2200V manufactured by Rigaku Corporation as in Example 1 was used. As a result, the powder was confirmed to have a perovskite structure having rhombohedral crystals (113).

(ii) EPMA Analysis

Further, the powder was subjected to EPMA analysis in the same manner as in Example 1, and peak intensities of the L$\alpha$1 characteristic X-ray of lanthanum, the L$\alpha$1 characteristic X-ray of strontium, the K$\alpha$1 characteristic X-ray of iron and the K$\alpha$1 characteristic X-ray of cobalt were measured by the unit of count.

The dispersion point showing the composition distribution, determined by the peak intensity [Sr] of the L$\alpha$1 characteristic X-ray of strontium and the peak intensity [La] of the L$\alpha$1 characteristic X-ray of lanthanum of the powder was distributed in a region represented by the formula (15) in the vicinity of $[Sr]=0.3146[La]+3.8285$:

$$0.31[La]-92 \leq [Sr] \leq 0.31[La]+92 \quad (15)$$

Further, the dispersion point showing the composition distribution, determined by the peak intensity [Fe] of the K$\alpha$1 characteristic X-ray of iron and the peak intensity [Co] of the K$\alpha$1 characteristic X-ray of cobalt of the powder was distributed in a region represented by the formula (16) in the vicinity of $[Fe]=0.2271[Co]+2.7800$:

$$0.23[Co]-68 \leq [Fe] \leq 0.23[Co]+68 \quad (16)$$

(iii) Particle Size Distribution Measurement

Particle size distribution measurement was carried out in the same manner as in Example 1. As a result, the volume average particle size $D_{50}$ of $La_{0.8}Sr_{0.2}Co_{0.8}Fe_{0.2}O_3$ was 16.1 μm.

Example 5

(1) (Preparation of Raw Material Powders and Organic Acid)

Raw material powders were weighed to form $La_{0.6}Sr_{0.4}Co_{0.8}Fe_{0.2}O_3$.

That is, 412.1 g of lanthanum hydroxide $(La(OH)_3)$ as a La source, 213.9 g of strontium carbonate $(SrCO_3)$ as a Sr source, 365.6 g of cobalt carbonate $(CoCO_3)$ having a Co content of 46.58% manufactured by NIHON KAGAKU SANGYO CO., LTD. as a Co source and 88.50 g of hydrated iron hydroxide $(Fe(OH)_3)_3$ having a Fe content of 45.58% as a Fe source (La:Sr:Co:Fe of 0.6:0.4:0.8:0.2 by the atomic ratio) were weighed as shown in Table 1. Separately, into a 20 L separable flask, 1,973 g of citric acid monohydrate and 4.0 L (liter) of pure water at 55° C. were added to prepare a citric acid aqueous solution, and 1,470 g of diammonium hydrogencitrate was added thereto and dissolved in a stirring tank reactor at 28° C.

(2) (Intermediate Product and Drying)

To the above citric acid aqueous solution into which disodium hydrogencitrate was added, lanthanum hydroxide was charged and heated at 70° C., followed by reaction at the temperature for 2 hours. Lanthanum hydroxide was completely dissolved, and a colorless transparent solution was obtained. To the solution, strontium carbonate, cobalt carbonate and hydrated iron hydroxide were added, followed by reaction at 55° C. further for 2 hours. The metal salts were completely dissolved, and a blackish brown transparent solution was obtained.

After completion of the reaction, the obtained solution was dried by a spray dryer to obtain a dry powder of a composite citrate as an intermediate product. As the spray dryer, the same BDP-10 Spray Bag Dryer (manufactured by OHKAWARA KAKOHKI CO., LTD.) as in Example 1 was used, and drying was carried out under the same conditions as in Example 1.

(3) (Crude Firing, Temporary Firing and Main Firing)

The obtained dry powder was subjected to crude firing and temporary firing under the same conditions as in Example 1.

The temporary-fired powder was filled in one 30 cm square mullite crucible, and fired in the air in an electric furnace at 800° C. for 6 hours and crushed to obtain a LSCF final powder ($La_{0.6}Sr_{0.4}Co_{0.8}Fe_{0.2}O_3$) (main firing). The temperature-raising rate from room temperature to 800° C. was 800° C./4 hours, and the temperature-decreasing rate from 800° C. to room temperature was 100° C./1 hour.

(4) (Component Analysis)

(i) XRD Analysis

A small amount of the $La_{0.6}Sr_{0.4}Co_{0.8}Fe_{0.2}O_3$ final powder was collected, and subjected to powder X-ray diffraction measurement using CuKα as an X-ray source to identify the crystal phase. For X-ray diffraction measurement, the same RINT2200V manufactured by Rigaku Corporation as in Example 1 was used. As a result, the powder was confirmed to have a perovskite structure having rhombohedral crystals (113).

(ii) EPMA Analysis

Further, the powder was subjected to EPMA analysis in the same manner as in Example 1, and peak intensities of the Lα1 characteristic X-ray of lanthanum, the Lα1 characteristic X-ray of strontium, the Kα1 characteristic X-ray of iron and the Kα1 characteristic X-ray of cobalt were measured by the unit of count.

Figure 7:
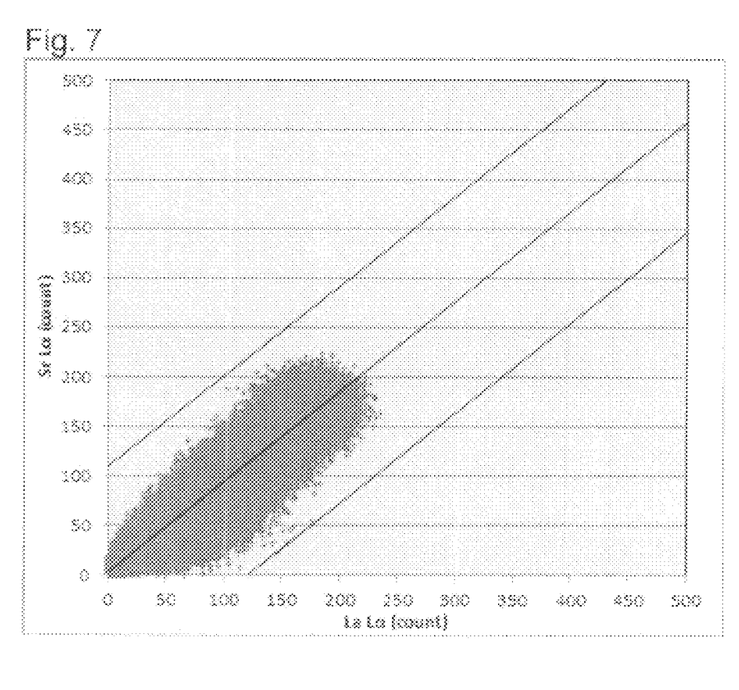
FIG. 7 is a dispersion diagram illustrating a composition distribution showing the peak intensity [Sr] of the Lα1 characteristic X-ray of strontium and the peak intensity [La] of the Lα1 characteristic X-ray of lanthanum of LSCF fine particles in Example 5 in axes.

FIG. 7 is a diagram showing the peak intensity [Sr] of the Lα1 characteristic X-ray of strontium as obtained by the EPMA measurement of the powder in the vertical axis and the peak intensity [La] of the Lα1 characteristic X-ray of lanthanum in the horizontal axis.

In FIG. 7, the dispersion point showing the composition distribution, determined by the peak intensity [Sr] of the Lα1 characteristic X-ray of strontium and the peak intensity [La] of the Lα1 characteristic X-ray of lanthanum was distributed in a region represented by the formula (17) in the vicinity of [Sr]=0.9095[La]+3.9086:

$$0.91[La]-110 \leq [Sr] \leq 0.91[La]+110 \quad (17)$$

Figure 8:
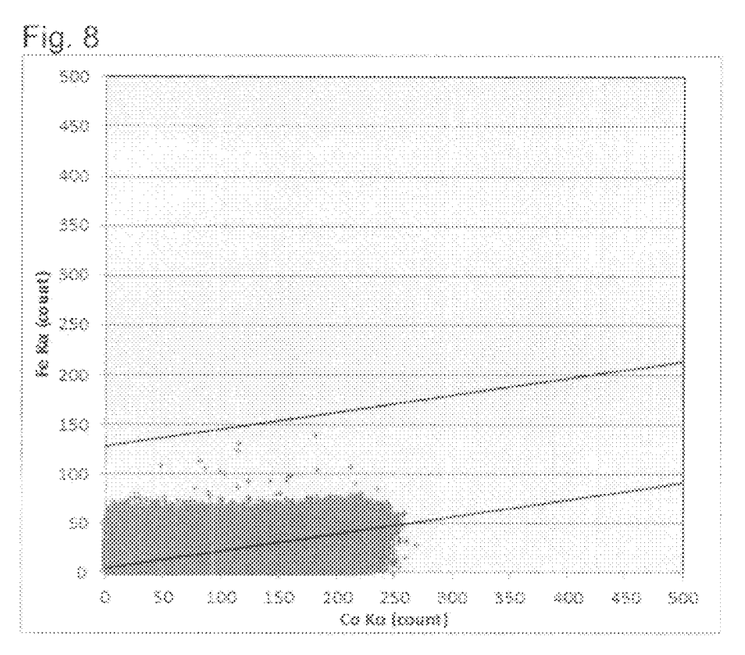
FIG. 8 is a dispersion diagram illustrating a composition distribution showing the peak intensity [Fe] of the Kα1 characteristic X-ray of iron and the peak intensity [Co] of the Kα1 characteristic X-ray of cobalt of LSCF fine particles in Example 5 in axes.

Further, FIG. 8 is a diagram showing the peak intensity [Fe] of the Kα1 characteristic X-ray of iron as obtained by the EPMA measurement of the powder in the vertical axis and the peak intensity [Co] of the Kα1 characteristic X-ray of cobalt in the horizontal axis.

In FIG. 8, the dispersion point showing the composition distribution determined by the peak intensity [Fe] of the Kα1 characteristic X-ray of iron and the peak intensity [Co] of the Kα1 characteristic X-ray of cobalt was distributed in a region represented by the formula (18) in the vicinity of [Fe]=0.1722 [Co]+5.2756:

$$0.17[Co]-128 \leq [Fe] \leq 0.17[Co]+128 \quad (18)$$

(iii) Particle Size Distribution Measurement

Particle size distribution measurement was carried out in the same manner as in Example 1. As a result, the volume average particle size $D_{50}$ of $La_{0.6}Sr_{0.4}Co_{0.8}Fe_{0.2}O_3$ was 15.8 μm.

Example 6

(1) (Preparation of Final Powder)

Raw material powders were weighed to form ($La_{0.6}Sr_{0.4}$)$_{0.99}Co_{0.2}Fe_{0.8}O_3$.

That is, as shown in Table 1, 355.5 g of lanthanum oxide ($La_2O_3$) as a La source, 214.9 g of strontium carbonate ($SrCO_3$) as a Sr source, 92.75 g of cobalt carbonate ($CoCO_3$) manufactured by NIHON KAGAKU SANGYO CO., LTD. having a Co content of 46.58% as a Co source and 882.3 g of iron citrate ($FeC_6H_5O_7 \cdot nH_2O$) having a Fe content of 18.56% as a Fe source were weighed (La:Sr:Co:Fe of 0.594:0.396:0.2:0.8 by the atomic ratio).

Separately, in a 20 L (liter) separable flask, 2,907 g of citric acid monohydrate in an amount of three times the number of moles of La ions, twice respectively the numbers of moles of Sr ions and Co ions and equal to the number of moles of Fe ions, was added to 4.0 L (liter) of pure water of 55° C. to prepare a citric acid aqueous solution. 1,033 g (6 times to the metal La) of ammonium bicarbonate was added thereto, and the compounds were dissolved at 28° C.

Thereafter, the same operation as in Example 1 was carried out except that the firing temperature in main firing was 800° C., to obtain a ($La_{0.6}Sr_{0.4}$)$_{0.99}Co_{0.2}Fe_{0.8}O_3$ powder.

The temperature-raising rate from room temperature to 800° C. was 800° C./4 hours, and the temperature-decreasing rate from 800° C. to room temperature was 100° C./1 hour.

(2) (Component Analysis)

(i) XRD Analysis

A small amount of the ($La_{0.6}Sr_{0.4}$)$_{0.99}Co_{0.2}Fe_{0.8}O_3$ final powder was collected, and subjected to powder X-ray diffraction measurement using CuKα as an X-ray source to identify the crystal phase. For the X-ray diffraction measurement, RINT2200V manufactured by Rigaku Corporation was used. As a result, the powder was confirmed to have a perovskite structure having rhombohedral crystals (113).

(ii) EPMA Analysis

Further, the above powder was subjected to EPMA analysis in the same manner as in Example 1, and the peak intensities of the Lα1 characteristic X-ray of lanthanum, the Lα1 characteristic X-ray of strontium, the Kα1 characteristic X-ray of iron and the Kα1 characteristic X-ray of cobalt were measured by the unit of count.

The dispersion point showing the composition distribution, determined by the peak intensity [Sr] of the Lα1 characteristic X-ray of strontium and the peak intensity [La] of the Lα1 characteristic X-ray of lanthanum, was distributed in a region represented by the formula (19) in the vicinity of [Sr]=0.7627 [La]+3.8587:

$$0.76[La]-118 \leq [Sr] \leq 0.76[La]+118 \quad (19)$$

Further, the dispersion point showing the composition distribution, determined by the peak intensity [Fe] of the Kα1 characteristic X-ray of iron and the peak intensity [Co] of the Kα1 characteristic X-ray of cobalt was distributed in a region represented by the formula (20) in the vicinity of [Fe]=3.2986 [Co]+8.2651:

$$3.3[Co]-228 \leq [Fe] \leq 3.3[Co]+228 \quad (20)$$

(iii) Particle Size Distribution Measurement

Particle size distribution measurement was carried out in the same manner as in Example 1. As a result, the volume average particle size $D_{50}$ of ($La_{0.6}Sr_{04}$)$_{0.99}Co_{0.2}Fe_{0.8}O_3$ was 15.1 μm.

The above results are shown in Table 1.

TABLE 1

| | Composition | Raw material compound | Metal content (%) | Amount used (g) | Organic acid | Amount used (g) | Ammonium compound | Amount used (g) | Main firing temperature (° C.) |
|---|---|---|---|---|---|---|---|---|---|
| Ex. 1 | $La_{0.6}Sr_{0.4}Co_{0.2}Fe_{0.8}O_3$ | Lanthanum oxide | 85.08 | 356.8 | Citric acid monohydrate | 2,908 | Ammonium bicarbonate | 1,037 | 1,000 |
| | | Strontium carbonate | 59.18 | 215.7 | | | | | |
| | | Cobalt carbonate | 46.58 | 92.16 | | | | | |
| | | Iron citrate | 18.56 | 876.7 | | | | | |
| Ex. 2 | $La_{0.6}Sr_{0.4}Co_{0.2}Fe_{0.8}O_3$ | Lanthanum oxide | 85.08 | 356.8 | Citric acid monohydrate, malic acid | 1,837 1,954 | — | — | 1,000 |
| | | Strontium carbonate | 59.18 | 215.7 | | | | | |
| | | Cobalt carbonate | 46.58 | 92.16 | | | | | |
| | | Iron citrate | 18.56 | 876.7 | | | | | |
| Ex. 3 | $La_{0.8}Sr_{0.2}Co_{0.2}Fe_{0.8}O_3$ | Lanthanum carbonate | 45.33 | 847.1 | Maleic acid | 1,910 | — | — | 1,200 |
| | | Strontium carbonate | 59.18 | 102.3 | | | | | |
| | | Cobalt hydroxide | 62.50 | 65.17 | | | | | |
| | | Hydrated iron hydroxide | 45.58 | 338.7 | | | | | |
| Ex. 4 | $La_{0.8}Sr_{0.2}Co_{0.8}Fe_{0.2}O_3$ | Lanthanum hydroxide | 73.05 | 521.5 | Lactic acid | 2,985 | — | — | 750 |
| | | Strontium carbonate | 59.18 | 101.5 | | | | | |
| | | Cobalt carbonate | 46.58 | 347.0 | | | | | |
| | | Hydrated iron hydroxide | 45.58 | 84.00 | | | | | |
| Ex. 5 | $La_{0.6}Sr_{0.4}Co_{0.8}Fe_{0.2}O_3$ | Lanthanum hydroxide | 73.05 | 412.1 | Citric acid monohydrate | 1,973 | Diammonium hydrogencitrate | 1,470 | 800 |
| | | Strontium carbonate | 59.18 | 213.9 | | | | | |
| | | Cobalt carbonate | 46.58 | 365.6 | | | | | |
| | | Hydrated iron hydroxide | 45.58 | 88.50 | | | | | |
| Ex. 6 | $La_{0.594}Sr_{0.396}Co_{0.2}Fe_{0.8}O_3$ | Lanthanum oxide | 85.08 | 355.5 | Citric acid monohydrate | 2,907 | Ammonium bicarbonate | 1,033 | 800 |
| | | Strontium carbonate | 59.18 | 214.9 | | | | | |
| | | Cobalt carbonate | 46.58 | 92.75 | | | | | |
| | | Iron citrate | 18.56 | 882.3 | | | | | |
| Comp. Ex. 1 | $La_{0.6}Sr_{0.4}Co_{0.2}Fe_{0.8}O_3$ | Lanthanum oxide | 85.08 | 356.8 | Citric acid monohydrate | 816 | — | — | 600 |
| | | Strontium carbonate | 59.18 | 215.7 | | | | | |
| | | Cobalt carbonate | 46.58 | 92.16 | | | | | |
| | | Iron citrate | 18.56 | 876.7 | | | | | |
| Comp. Ex. 2 | $La_{0.6}Sr_{0.4}Co_{0.2}Fe_{0.8}O_3$ | Lanthanum oxide | 85.08 | 356.8 | Citric acid monohydrate | 816 | — | — | 1,200 |
| | | Strontium carbonate | 59.18 | 215.7 | | | | | |
| | | Cobalt carbonate | 46.58 | 92.16 | | | | | |
| | | Iron citrate | 18.56 | 876.7 | | | | | |
| Comp. Ex. 3 | $La_{0.6}Sr_{0.4}Co_{0.2}Fe_{0.8}O_3$ | Lanthanum oxide | 85.08 | 356.8 | — | — | — | — | 1,100 |
| | | Strontium carbonate | 59.18 | 215.7 | | | | | |
| | | Cobalt carbonate | 46.58 | 92.16 | | | | | |
| | | Iron oxide | 69.54 | 234.0 | | | | | |

INDUSTRIAL APPLICABILITY

According to the present invention, it is possible to provide a novel LSCF powder having a more highly uniform composition as compared with one obtained by a conventional solid phase method, coprecipitation method or slurry method, as an air electrode material powder for a solid oxide fuel cell which is a composite oxide having a perovskite structure and containing lanthanum, strontium, cobalt, iron and oxygen. By sintering the LSCF powder having a highly uniform composition in the form of a molded product, a LSCF sintered product having an extremely uniform composition in principle can be obtained since the sintered product takes over this uniform composition.

Further, according to the production process of the present invention, a LSCF powder having a highly uniform composition can be obtained, and thus the present invention is highly industrially useful.

This application is a continuation of PCT Application No. PCT/JP2013/054229, filed on Feb. 20, 2013, which is based upon and claims the benefit of priority from Japanese Patent Application No. 2012-053479 filed on Mar. 9, 2012. The contents of those applications are incorporated herein by reference in their entireties.

What is claimed is:

1. A process for producing an air electrode material powder for a solid oxide fuel cell comprising a powder of a composite oxide having a perovskite structure and containing lanthanum, strontium, cobalt, iron and oxygen, wherein the dispersion point determined by the peak intensity [La] of the Lα1 characteristic X-ray of lanthanum and the peak intensity [Sr] of the Lα1 characteristic X-ray of strontium, obtained by EPMA (electron probe microanalyzer) measurement of element distribution of the powder, is present within a range of the formula (1), and the dispersion point determined by the peak intensity [Co] of the Kα1 characteristic X-ray of cobalt and the peak intensity [Fe] of the Kα1 characteristic X-ray of iron is present within a range of the formula (2):

$$a[La]-150<[Sr]<a[La]+150 \qquad (1)$$

$$b[Co]-300<[Fe]<b[Co]+300 \qquad (2)$$

wherein $0.2<a<1.0$ and $0.1<b<4.0$, the process comprising:
dissolving compounds, each containing a metal element constituting the composite oxide, with an aqueous solution of an organic acid;
spray drying the obtained solution; and
firing the obtained dry powder;
wherein the organic acid comprises at least one member selected from the group consisting of maleic acid, lactic acid, and malic acid.

2. The process for producing the air electrode material powder for a solid oxide fuel cell according to claim 1, wherein the number of moles of the organic acid used is from 2.3 to 10 times the total number of moles of the metal elements of the compounds each containing a metal element.

3. The process for producing the air electrode material powder for a solid oxide fuel cell according to claim 1, wherein the organic acid is a mixture of citric acid with at least one member selected from the group consisting of maleic acid, lactic acid and malic acid.

4. The process for producing the air electrode material powder for a solid oxide fuel cell according to claim 1, wherein the organic acid is a mixture of citric acid with malic acid.

5. A process for producing an air electrode material powder for a solid oxide fuel cell comprising a powder of a composite oxide having a perovskite structure and containing lanthanum, strontium, cobalt, iron and oxygen, wherein the dispersion point determined by the peak intensity [La] of the L$\alpha$1 characteristic X-ray of lanthanum and the peak intensity [Sr] of the L$\alpha$1 characteristic X-ray of strontium, obtained by EPMA (electron probe microanalyzer) measurement of element distribution of the powder, is present within a range of the formula (1), and the dispersion point determined by the peak intensity [Co] of the K$\alpha$1 characteristic X-ray of cobalt and the peak intensity [Fe] of the K$\alpha$1 characteristic X-ray of iron is present within a range of the formula (2):

$$a[La]-150<[Sr]<a[La]+150 \quad (1)$$

$$b[Co]-300<[Fe]<b[Co]+300 \quad (2)$$

wherein 0.2<a<1.0 and 0.1<b<4.0, the process comprising:
dissolving compounds, each containing a metal element constituting the composite oxide, with an aqueous solution of citric acid and an ammonium compound;
spray drying the obtained solution; and
firing the obtained dry powder.

6. The process for producing the air electrode material powder for a solid oxide fuel cell according to claim 5, wherein the ammonium compound is at least one member selected from the group consisting of ammonia, ammonium bicarbonate, ammonium carbonate and an ammonium citrate.

7. The process for producing the air electrode material powder for a solid oxide fuel cell according to claim 1, wherein each of the compounds each containing a metal element constituting the composite oxide is at least one member selected from the group consisting of a carbonate, an oxide, a hydroxide and an organic acid salt of each metal element.

8. The process for producing the air electrode material powder for a solid oxide fuel cell according to claim 1, wherein the firing temperature is from 700° C. to 1,300° C.

9. The process for producing the air electrode material powder for a solid oxide fuel cell according to claim 5, wherein the number of moles of the organic acid used is from 2.3 to 10 times the total number of moles of the metal elements of the compounds each containing a metal element.

10. The process for producing the air electrode material powder for a solid oxide fuel cell according to claim 5, wherein each of the compounds each containing a metal element constituting the composite oxide is at least one member selected from the group consisting of a carbonate, an oxide, a hydroxide and an organic acid salt of each metal element.

11. The process for producing the air electrode material powder for a solid oxide fuel cell according to claim 5, wherein the firing temperature is from 700° C. to 1,300° C.

* * * * *